US012611867B2

(12) United States Patent
Araki et al.

(10) Patent No.: US 12,611,867 B2

(45) Date of Patent: Apr. 28, 2026

(54) CLEANING APPARATUS FOR A RECORDING HEAD INCLUDES A LIQUID APPLICATION HEAD TO APPLY A LIQUID TO A NOZZLE FORMATION SURFACE OF THE RECORDING HEAD

(71) Applicant: CANON KABUSHIKI KAISHA, Tokyo (JP)

(72) Inventors: Ryosuke Araki, Kanagawa (JP); Seiji Suzuki, Kanagawa (JP); Takaya Sato, Tokyo (JP); Ran Kudo, Tokyo (JP); Takuya Hane, Kanagawa (JP); Takatoshi Nakano, Kanagawa (JP); Tsukasa Sano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 18/592,398

(22) Filed: Feb. 29, 2024

(65) Prior Publication Data

US 2024/0308223 A1 Sep. 19, 2024

(30) Foreign Application Priority Data

Mar. 14, 2023 (JP) ................................ 2023-039439

(51) Int. Cl.
*B41J 2/165* (2006.01)

(52) U.S. Cl.
CPC ....... *B41J 2/16552* (2013.01); *B41J 2/16535* (2013.01)

(58) Field of Classification Search
CPC ................ B41J 2/16552; B41J 2/16535; B41J 2002/16558; B41J 2/16538
See application file for complete search history.

(56) References Cited

U.S. PATENT DOCUMENTS 8,061,805 B2 11/2011 Suzuki et al. ........... B41J 2/165
8,752,930 B2 6/2014 Doi et al. ................. B41J 2/045
(Continued)

FOREIGN PATENT DOCUMENTS

JP 2010-058338 3/2010
JP 2013141743 A * 7/2013 .......... B41J 2/16523
(Continued)

OTHER PUBLICATIONS

U.S. Appl. No. 18/744,470, filed Jun. 14, 2024.

*Primary Examiner* — Sharon Polk
(74) *Attorney, Agent, or Firm* — Venable LLP

(57) ABSTRACT

A cleaning apparatus for a recording head that ejects ink onto a recording medium, including a liquid application head to apply a liquid to a nozzle formation surface of the recording head and a liquid removal unit to remove the liquid from the nozzle formation surface. The liquid application head has a liquid application member having flexibility and a first surface on an upstream side in a liquid application direction, a second surface crossing the first surface, and a third surface on a downstream side in the liquid application direction, the first an second surfaces contacting the nozzle formation surface, the third surface and the nozzle formation surface having a gap therebetween, and a liquid supply member having a supply flow path to supply the liquid to the nozzle formation surface. A liquid application width of the liquid application head is narrower than a width of the nozzle formation surface.

13 Claims, 21 Drawing Sheets

(56) References Cited

U.S. PATENT DOCUMENTS

| | | | | |
|---|---|---|---|---|
| 8,757,766 | B2 | 6/2014 | Suzuki et al. | B41J 2/165 |
| 8,851,618 | B2 | 10/2014 | Teshigawara et al. | B41J 29/393 |
| 9,079,408 | B2 | 7/2015 | Suzuki et al. | B41J 2/165 |
| 9,193,169 | B2 | 11/2015 | Sunouchi et al. | B41J 2/175 |
| 10,265,951 | B2 | 4/2019 | Nakano et al. | B41J 2/195 |
| 10,286,657 | B2 | 5/2019 | Kameshima et al. | B41J 2/045 |
| 10,427,410 | B2 | 10/2019 | Nakagawa et al. | B41J 2/165 |
| 10,442,191 | B2 | 10/2019 | Takahashi et al. | B41J 2/045 |
| 10,493,762 | B2 | 12/2019 | Sato et al. | B41J 2/165 |
| 10,543,680 | B2 | 1/2020 | Fukasawa et al. | B41J 2/045 |
| 10,654,265 | B2 | 5/2020 | Fukasawa et al. | B41J 2/045 |
| 10,675,898 | B2 | 6/2020 | Fukasawa et al. | B41J 2/165 |
| 10,843,467 | B2 | 11/2020 | Nakai et al. | B41J 2/165 |
| 10,843,468 | B2 | 11/2020 | Nakagawa et al. | B41J 2/165 |
| 11,117,377 | B2 | 9/2021 | Nakagawa et al. | B41J 2/165 |
| 11,141,990 | B2 | 10/2021 | Fukasawa et al. | B41J 2/18 |
| 11,198,290 | B2 | 12/2021 | Fukasawa et al. | B41J 2/045 |
| 11,305,566 | B2 | 4/2022 | Fukasawa et al. | B41J 29/17 |
| 11,345,154 | B2 | 5/2022 | Kiuchi et al. | B41J 2/175 |
| 11,559,992 | B2 | 1/2023 | Nakagawa et al. | B41J 2/165 |
| 11,642,889 | B2 | 5/2023 | Nakagawa et al. | B41J 2/165 |
| 11,745,525 | B2 | 9/2023 | Fukasawa et al. | B41J 29/38 |
| 11,794,479 | B2 | 10/2023 | Kiuchi et al. | B41J 2/165 |
| 11,919,318 | B2 | 3/2024 | Fukasawa et al. | B41J 2/18 |
| 11,999,167 | B2 | 6/2024 | Nakagawa et al. | B41J 2/165 |
| 12,017,452 | B2 | 6/2024 | Fukasawa et al. | B41J 2/045 |
| 2024/0165960 | A1 | 5/2024 | Fukasawa et al. | B41J 2/18 |

FOREIGN PATENT DOCUMENTS

| | | | | |
|---|---|---|---|---|
| JP | 2014195881 A | * | 10/2014 | |
| WO | WO-2020095822 A1 | * | 5/2020 | B41J 2/16552 |

* cited by examiner

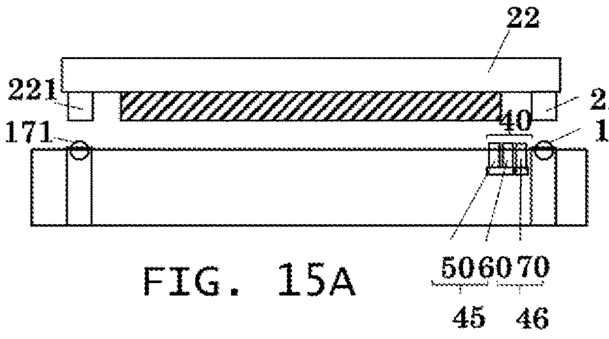
FIG. 15A
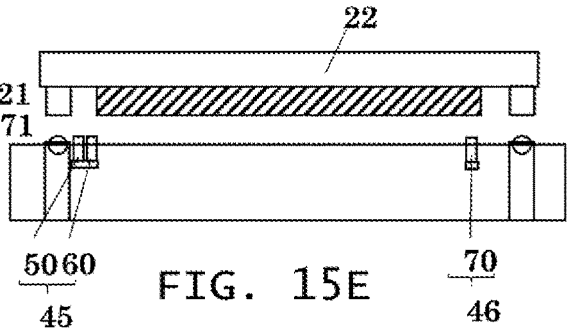
FIG. 15E
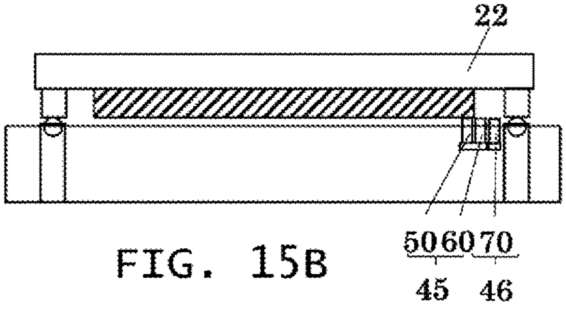
FIG. 15B
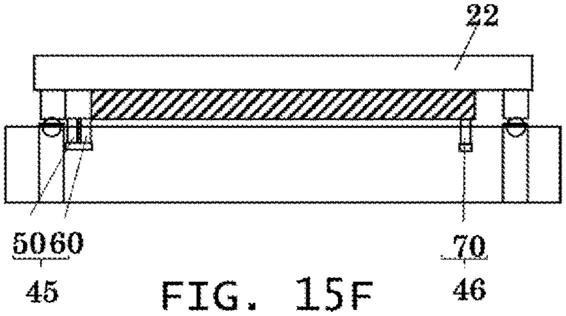
FIG. 15F
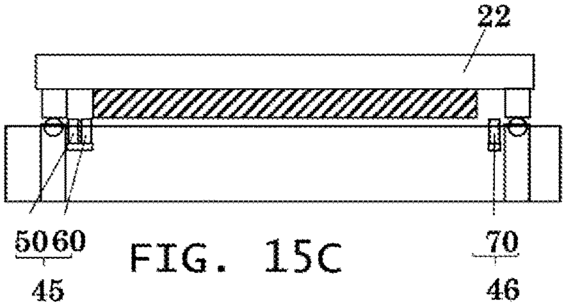
FIG. 15C
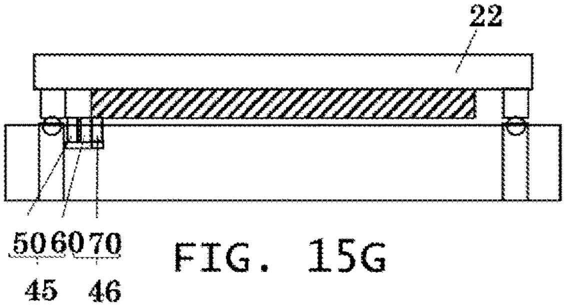
FIG. 15G
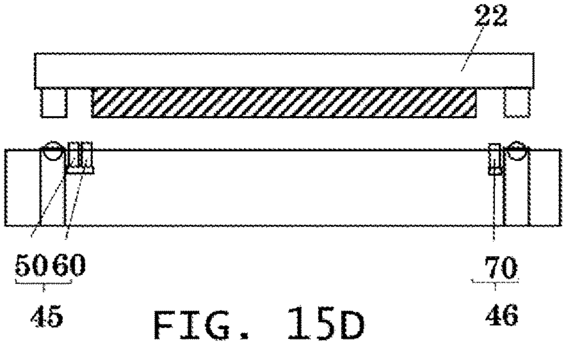
FIG. 15D
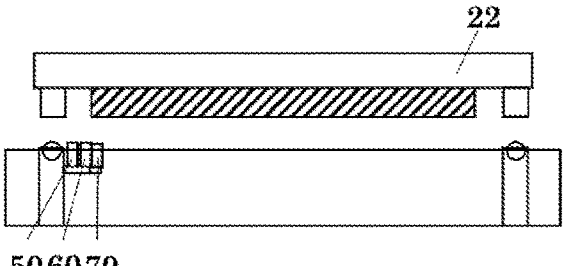
FIG. 15H
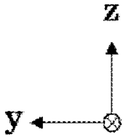

CLEANING APPARATUS FOR A RECORDING HEAD INCLUDES A LIQUID APPLICATION HEAD TO APPLY A LIQUID TO A NOZZLE FORMATION SURFACE OF THE RECORDING HEAD

CROSS-REFERENCE TO RELATED APPLICATION

This application claims the benefit of Japanese Patent Application No. 2023-039439, filed on Mar. 14, 2023, which is hereby incorporated by reference herein in its entirety.

BACKGROUND OF THE INVENTION

Field of the Invention

The present invention relates to a cleaning apparatus for a recording head.

Description of the Related Art

Conventionally, inkjet recording apparatuses, or the like, have been known as image forming apparatuses that eject ink onto continuous-sheet recording media wound on rolls to record characters, images, or the like. Examples of such inkjet recording apparatuses include line head type recording apparatuses that eject liquid droplets from recording heads to perform recording in conjunction with transport of media to be recorded in a state in which the recording heads do not move with respect to a body.

Such recording apparatuses have a problem that ink ejected from nozzles float in the air as mist without landing on sheets and adhere to the nozzles in the process of image formation, and ejected ink droplets are misdirected to cause a degradation in image quality.

As a solution to this problem, a configuration in which an ejection nozzle formation surface is wiped off by a blade having elasticity to restore the ejection nozzle surface to a state before ejection and maintain ejection performance has been known. However, in a case when an adhering force of ink adhering to the nozzle formation surface of an ejection head is large, a wiping-off force of the blade is needed to be increased, whereas damage on an ejection nozzle surface is needed to be reduced.

Japanese Patent Application Laid-open No. 2010-058338 discloses, as a cleaning configuration including a wipe blade that wipes off a nozzle formation surface, a configuration in which a cleaning liquid is supplied from between a wipe blade and a plate opposed to the wipe blade, and a nozzle surface of an ejection head is cleaned with the blade wet to reduce damage on the ejection nozzle surface.

SUMMARY OF THE INVENTION

A conventional example disclosed in Japanese Patent Application Laid-open No. 2010-058338 provides a configuration in which the cleaning liquid is supplied from between the blade that wipes off the nozzle formation surface and the plate opposed to the blade, whereby the nozzle formation surface is wiped off with the blade wet. However, since the blade and the plate opposed to the blade are not integrally formed, there is a problem that the cleaning liquid overflows from between the blade and the plate, and an amount of the cleaning liquid needed to be supplied becomes great in proportion to an amount of the cleaning liquid needed to perform cleaning on the nozzle formation surface. Further, the cleaning liquid applied to the nozzle formation surface is immediately wiped off by the blade without being accumulated on the nozzle formation surface. Therefore, it is not possible to apply a required amount of the cleaning liquid to the nozzle formation surface.

The present invention has been made in view of the above problems. The present invention has an object of appropriately performing cleaning on a nozzle formation surface of a recording apparatus.

The present invention provides a cleaning apparatus for a recording head that ejects ink onto a recording medium, the cleaning apparatus comprising a liquid application head configured to apply a liquid to a nozzle formation surface of the recording head, and a liquid removal unit configured to remove the liquid from the nozzle formation surface, wherein the liquid application head has a liquid application member having flexibility and having a first surface on an upstream side in a liquid application direction, a second surface crossing the first surface, and a third surface on a downstream side in the liquid application direction, the first surface and the second surface contacting the nozzle formation surface, the third surface and the nozzle formation surface having a gap therebetween, and a liquid supply member having a supply flow path configured to supply the liquid to the nozzle formation surface, and wherein a liquid application width of the liquid application head is narrower than a width of the nozzle formation surface, and a liquid removal width of the liquid removal unit is wider than the liquid application width of the liquid application head in a direction perpendicular to the liquid application direction.

According to the present invention, it is possible to appropriately perform cleaning on a nozzle formation surface of a recording apparatus.

Further features of the present invention will become apparent from the following description of exemplary embodiments with reference to the attached drawings.

BRIEF DESCRIPTION OF THE DRAWINGS

FIGS. 15A to 15H are schematic views showing an operation example of the maintenance unit.

DESCRIPTION OF THE EMBODIMENTS

Here after, preferred embodiments of the present invention will be exemplarily described in detail with reference to the drawings. However, the dimensions, materials, shapes, their relative arrangements, or the like, of constituting components described in the embodiments will not intend to limit the scope of the present invention unless otherwise particularly described. Further, the materials, shapes, or the like, of members once described in preceding embodiments will be the same also in subsequent embodiments unless otherwise particularly described.

First Embodiment

Figure 1:
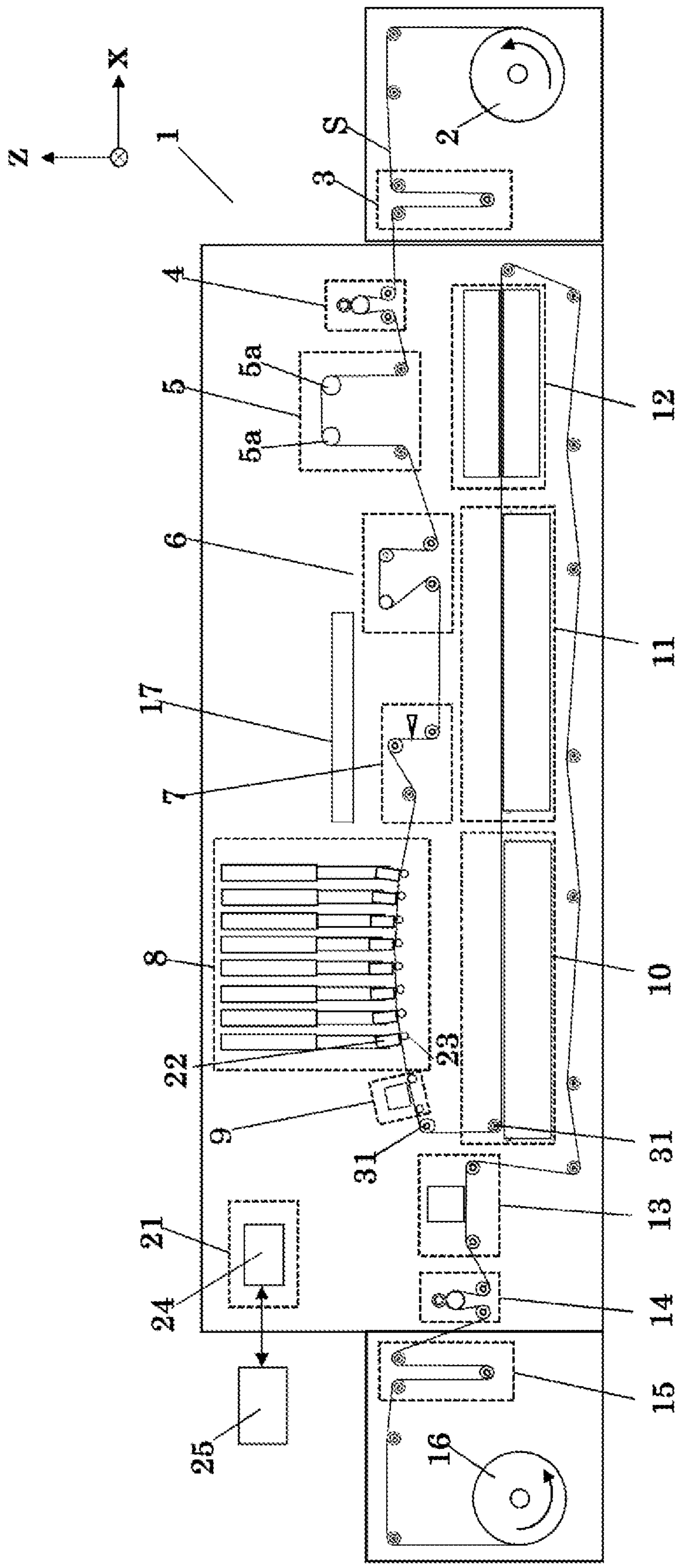
FIG. 1 is a schematic view showing the internal configuration of a recording apparatus.

To begin with, an apparatus upper side, a direction from right to left, and a direction from a near side to a back side of space orthogonal to a sheet transport direction will be defined as an upper direction, a longitudinal direction, a sheet width direction, respectively, in FIG. 1. A recording apparatus 1 of this embodiment is a high-speed line printer that uses a continuous sheet wound in a roll shape.

Recording Apparatus

FIG. 1 is a schematic cross-sectional view showing the internal configuration of the recording apparatus 1. Inside the recording apparatus of this embodiment, respective units of an unwinding roll unit 2, a first dancer unit 3, a first main transport unit 4, a meandering correction unit 5, a transport detection unit 6, a mark sensor unit 7, a recording unit 8, a first scanner unit 9, a first drying unit 10, a second drying unit 11, a cooling unit 12, a second scanner unit 13, a second main transport unit 14, a second dancer unit 15, a winding roll unit 16, and a maintenance tray 17 are provided. A sheet S is transported along a sheet transport path indicated by a solid line in FIG. 1, and subjected to processing by the respective units.

The unwinding roll unit 2 is a unit that holds and supplies a continuous sheet wound in a roll shape. The unwinding roll unit 2 is configured to accommodate an unwinding roll and draw and to supply the sheet S. Note that the number of rolls accommodatable in the unwinding roll unit 2 is not limited to one, but the unwinding roll unit 2 may be also configured to accommodate two or at least three rolls and to selectively draw and to supply the sheet S. The sheet S is a recording medium, and recording of an inkjet system is performed when ink is ejected from recording heads onto the recording medium.

The first dancer unit 3 is a unit that applies constant sheet tension between the unwinding roll unit 2 and the first main transport unit 4. The first dancer unit 3 applies sheet tension by a tension application unit not shown.

The first main transport unit 4 is a unit that feeds the sheet S to the meandering correction unit 5, the transport detection unit 6, the mark sensor unit 7, the recording unit 8, the first scanner unit 9, the first drying unit 10, the second drying unit 11, the cooling unit 12, and the second scanner unit 13 arranged in this order along the sheet transport path (sheet S), and apply sheet tension between the first main transport unit 4 and the second main transport unit 14. The first main transport unit 4 rotates when a motor not shown is driven, and transports the sheet S with tension.

The meandering correction unit 5 is a unit that corrects meandering of the sheet S in the sheet width direction when the sheet S is transported with tension. The meandering correction unit 5 is configured to include meandering correction rollers 5*a* and a meandering detection sensor not shown that detects meandering of the sheet S. The meandering correction rollers 5*a* are capable of changing a tilt of the sheet S by a motor not shown, and correct meandering of the sheet S on the basis of measurement by the meandering detection sensor. At this time, the function of correcting the meandering may be increased with the sheet S wound on the meandering correction rollers 5*a*.

The transport detection unit 6 is a unit that detects tension when the sheet S is transported between the first main transport unit 4 and the second main transport unit 14 with the tension. Further, the transport detection unit 6 is also a unit that detects the speed of the sheet S in order to control image formation timing of the recording unit 8.

The mark sensor unit 7 is a unit that detects a mark printed in advance on the sheet S in order to control image formation timing of the recording unit 8.

The recording unit 8 is a sheet processing unit that performs recording processing on the transported sheet S by recording heads 22 from above the sheet S to form an image. A transport path in the recording unit 8 is formed by guide rollers 23 arranged in an upwardly-protruded arc shape, and clearance is secured between the transport path and the recording heads 22 with constant tension applied to the sheet S. As the recording heads 22, a plurality of recording heads, are arranged side by side along the transport direction. In this embodiment, totally eight line-type recording heads, corresponding to a reaction liquid and three specific colors in addition to four colors of Bk (black), Y (yellow), M (magenta), and C (cyan), are provided. Note that the numbers of colors and the recording head 22 are not limited to eight. As an inkjet system, a system using heater elements, a system using piezoelectric elements, a system using electrostatic elements, a system using MEMS elements, or the like, is available. The respective colors of ink is supplied to the recording heads 22 via respective ink tubes from ink tanks not shown.

Figure 2:
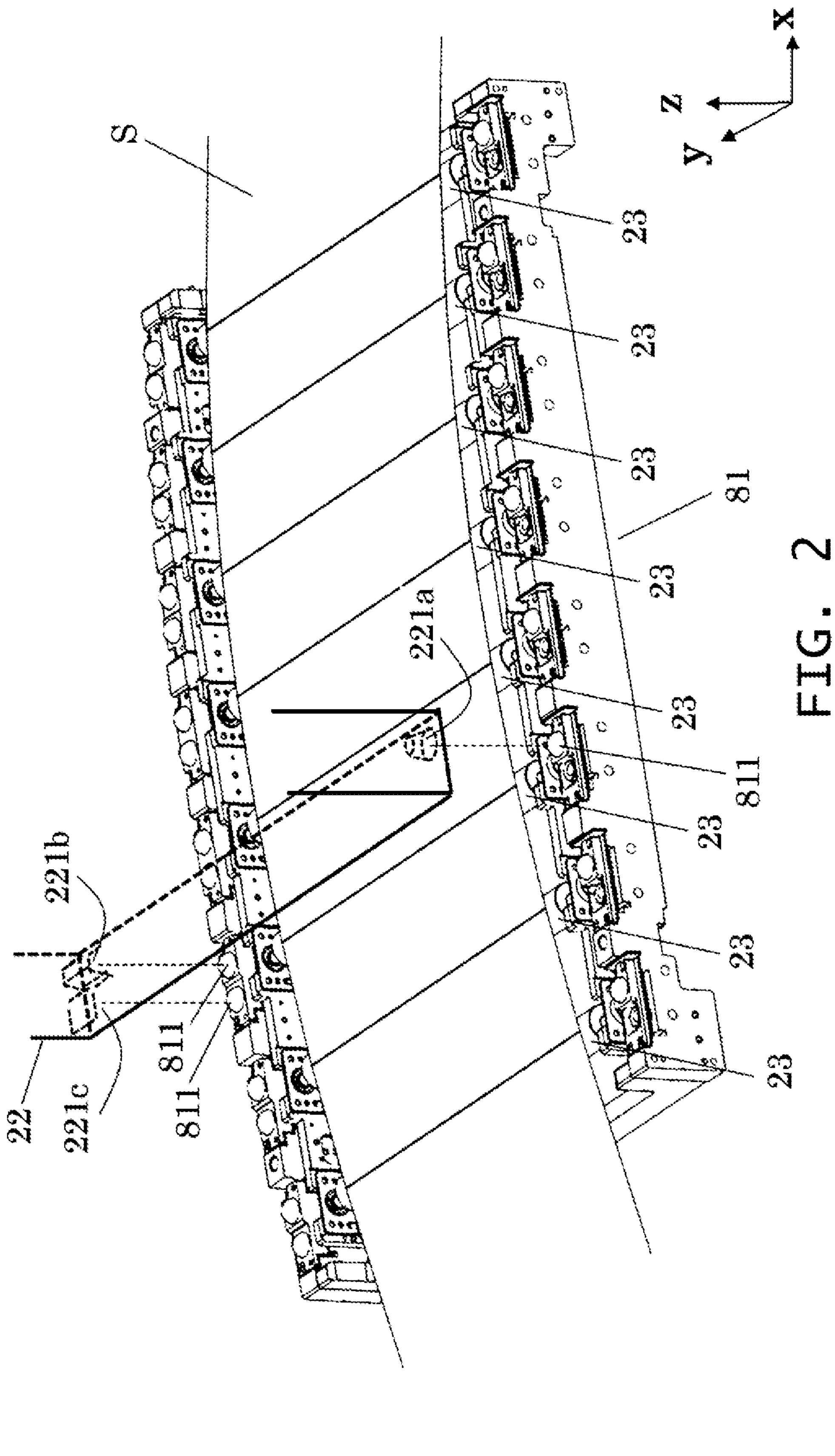
FIG. 2 is a perspective view of a sheet-transport-unit housing of a recording unit.

Further, as shown in FIG. 2, a plurality of recording-head positioning members 811 that performs positioning of the recording heads are provided in a sheet-transport-unit housing 81 of the recording unit 8, and each one recording-head positioning member 811 and each two recording-head positioning members are provided back and forth on the near side and the back side, respectively, in the sheet-width direction across the sheet S.

Figure 3:
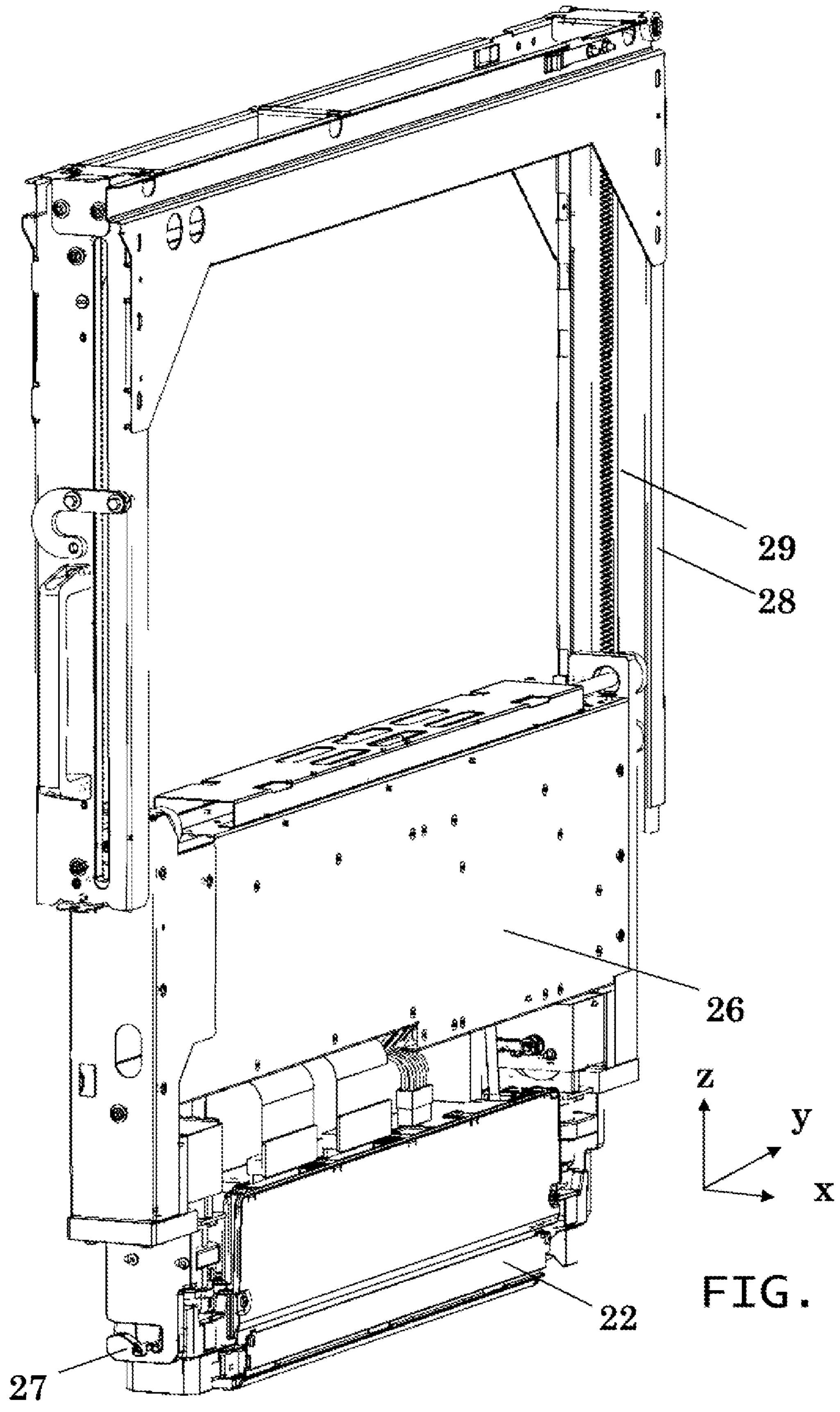
FIG. 3 is a perspective view of a recording-head lifting mechanism.

Further, as shown in FIG. 3, a recording head 22 is pivotally supported by a recording-head holding unit 26 that holds and vertically lifts the recording head 22 so as to support a recording-head support shaft 27 from a lower side. The recording-head holding unit 26 vertically performs a lifting operation along recording-head lifting rails 29 provided in a recording-head lifting frame 28 by a driving mechanism not shown provided in the recording-head holding unit 26.

Figure 4:
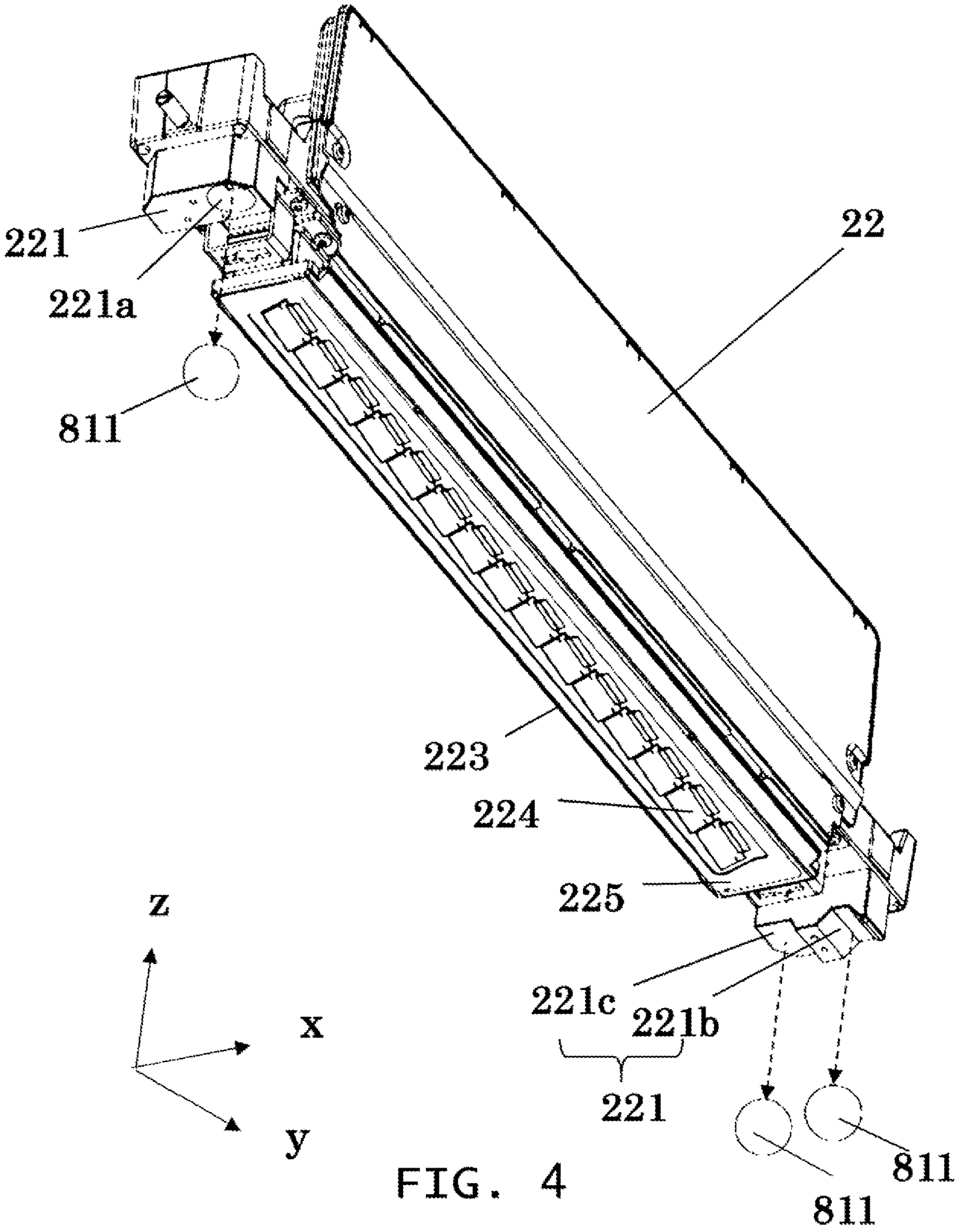
FIG. 4 is a perspective view of a nozzle formation surface of the recording head.

FIG. 4 is a view of a recording head 22 when seen from a sheet transport side, and a plurality of nozzle plates 224 that eject ink droplets onto the sheet S are provided on a nozzle formation surface 223 opposed to the sheet.

The first scanner unit 9 is a unit that reads an image formed on the sheet S by the recording unit 8 during printing, detects a deviation or density of the image, and corrects the printing.

The first drying unit 10 and the second drying unit 11 are units that decrease a liquid content contained in ink applied onto the sheet S by the recording unit 8, and enhance fixing performance between the sheet S and the ink. The second drying unit 11 is arranged on a downstream side in the sheet transport direction of the first drying unit 10. The first drying unit 10 and the second drying unit 11 heat the recorded sheet S to dry applied ink. Inside the first drying unit 10 and the second drying unit 11, hot air is applied to the passing sheet S from at least an ink application surface side to dry an ink application surface of the sheet S. Note that a drying method is not limited to a hot-air application method, but a combination of a method in which a surface of the sheet S is irradiated with electromagnetic waves (such as ultraviolet rays and infrared rays) and a conductive heat transmission method using contact of a heat generation body may be used.

A winding guide roller 31 is a roller that winds a surface on the side opposite to the ink application surface of the sheet S on a transport downstream side of the recording unit 8 at a constant winding angle since the influence of hot air by the first drying unit 10 on the recording unit 8 is needed to be blocked. In this embodiment, two winding guide rollers 31 are arranged between the first scanner unit 9 and the first drying unit 10, and the sheet S is turned down substantially parallel in a vertical direction of the apparatus. The first drying unit 10 is arranged under the apparatus with respect to the recording unit 8, and the second drying unit 11 is arranged under the apparatus with respect to the transport detection unit 6 and the mark sensor unit 7 described above.

The cooling unit 12 cools the sheet S fixed by the first drying unit 10 and the second drying unit 11, solidifies softened ink, and reduces a temperature change amount of the sheet S in a downstream process of the recording apparatus 1. Inside the cooling unit 12, air having a temperature lower than that of the sheet S is applied to the passing sheet S from at least the ink application surface side to cool the ink application surface of the sheet S. Note that a cooling method is not limited to an air application method, but a conductive heat transmission method based on contact of a radiation member and a combination of the methods may be used.

The second scanner unit 13 is a unit that reads a test image formed on the sheet S by the recording unit 8 before printing and detects a deviation or density of the image to correct regular printing.

The second main transport unit 14 is a unit that transports the sheet S while applying tension to the same with the first main transport unit 4 and adjusts the tension of the sheet S. The second main transport unit 14 rotates when driven by a motor (not shown), and adjusts the tension of the sheet S by a clutch (not shown) that is enabled to control a drive-linked torque according to a tension value detected by the transport detection unit 6 under a tension control unit not shown. Note that the transport detection unit 6 may control the speed of the second main transport unit 14 as an additional configuration to adjust the tension of the sheet S. In this case, two methods, a torque control method for controlling a value of a torque transmitted from the clutch and a speed control method for controlling the roller speed of the second main transport unit 14 are available as tension control methods. The tension control methods may be switched according to purposes or used at the same time.

The second dancer unit 15 is a unit that applies constant sheet tension between the second main transport unit 14 and the winding roll unit 16. The second dancer unit 15 applies sheet tension by a tension application unit (not shown).

The winding roll unit 16 is a unit that winds the recorded sheet S on a winding core. The number of accommodatable rolls is not limited to one. As another configuration, two or at least three winding cores may be provided and selectively switched to collect the sheet S. Note that the sheet S may not be wound on a winding core depending on a processing content after recording. As another configuration, it may be possible to cut off a continuous sheet using a cutter and to stack the cut-off sheets S.

A control unit 21 is a unit responsible for controlling the respective units of the whole recording apparatus. The control unit 21 has a CPU, a storage device, a controller including various control units, an external interface, and an operation unit 24 operated by a user to perform an input and an output. The operation of the recording apparatus 1 is controlled on the basis of instructions from a controller or a host apparatus 25 such as a host computer connected to the controller via an external interface.

The maintenance tray 17 is a unit including the function of recovering the ejection performance of the recording heads 22. Examples of such a mechanism include a cap mechanism to protect ink ejection surfaces of the recording heads 22, a wiper mechanism to wipe off the ink ejection surfaces, and a suction mechanism to suck ink inside the recording heads 22 by a negative pressure from the ink ejection surfaces.

Configuration Example of Maintenance Tray

Figure 5:
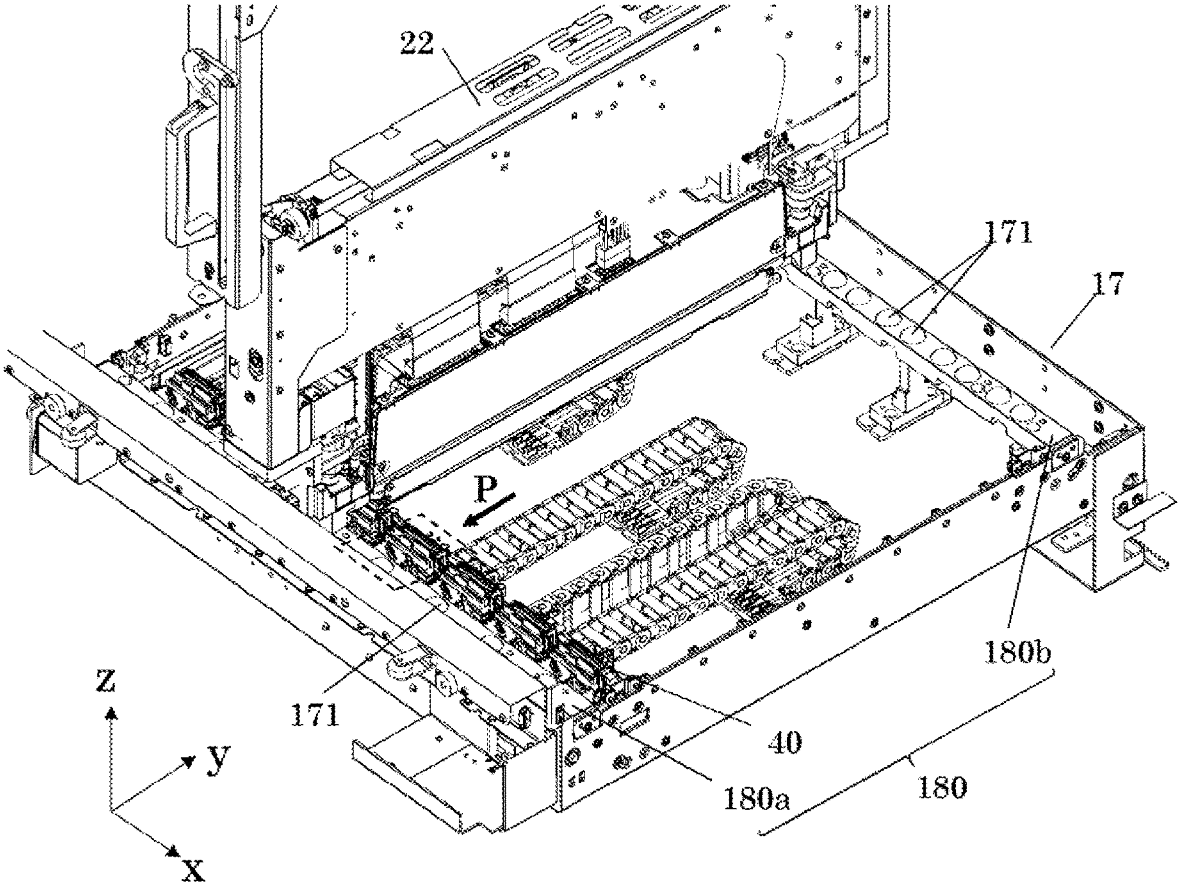
FIG. 5 is a perspective view of a maintenance tray.

In this embodiment, the maintenance tray 17 has, as shown in FIG. 5, maintenance units 40 for the respective recording heads 22 and a plurality of spherical recording-head positioning members 171 that perform positioning of the recording heads 22 with respect to the maintenance units 40. Inside the maintenance tray 17, the recording-head positioning members 171 are arranged back and forth in a y-direction that is an apparatus depth direction, and held by beam members 180 arranged along an x-direction that is the sheet transport direction. The number of the recording-head positioning members 171 needed to perform positioning of one recording head 22 with respect to the maintenance tray 17 is three. Among the three recording-head positioning members 171, one recording-head positioning member 171 and two recording-head positioning members 171 are arranged on a near-side beam *180a* and a back-side beam *180b* inside the maintenance tray 17, respectively. Note that two balls and one ball may be arranged on the near side and the back side, respectively, to perform positioning as another configuration. Further, a positioning configuration is not limited to a configuration in which spherical positioning members are used, but a configuration in which parts of the recording heads 22 are abutted on the inside of the maintenance tray 17 or a configuration in which positioning is performed using holes made in the maintenance tray 17 and the recording heads 22 and pins may be used.

Figure 6:
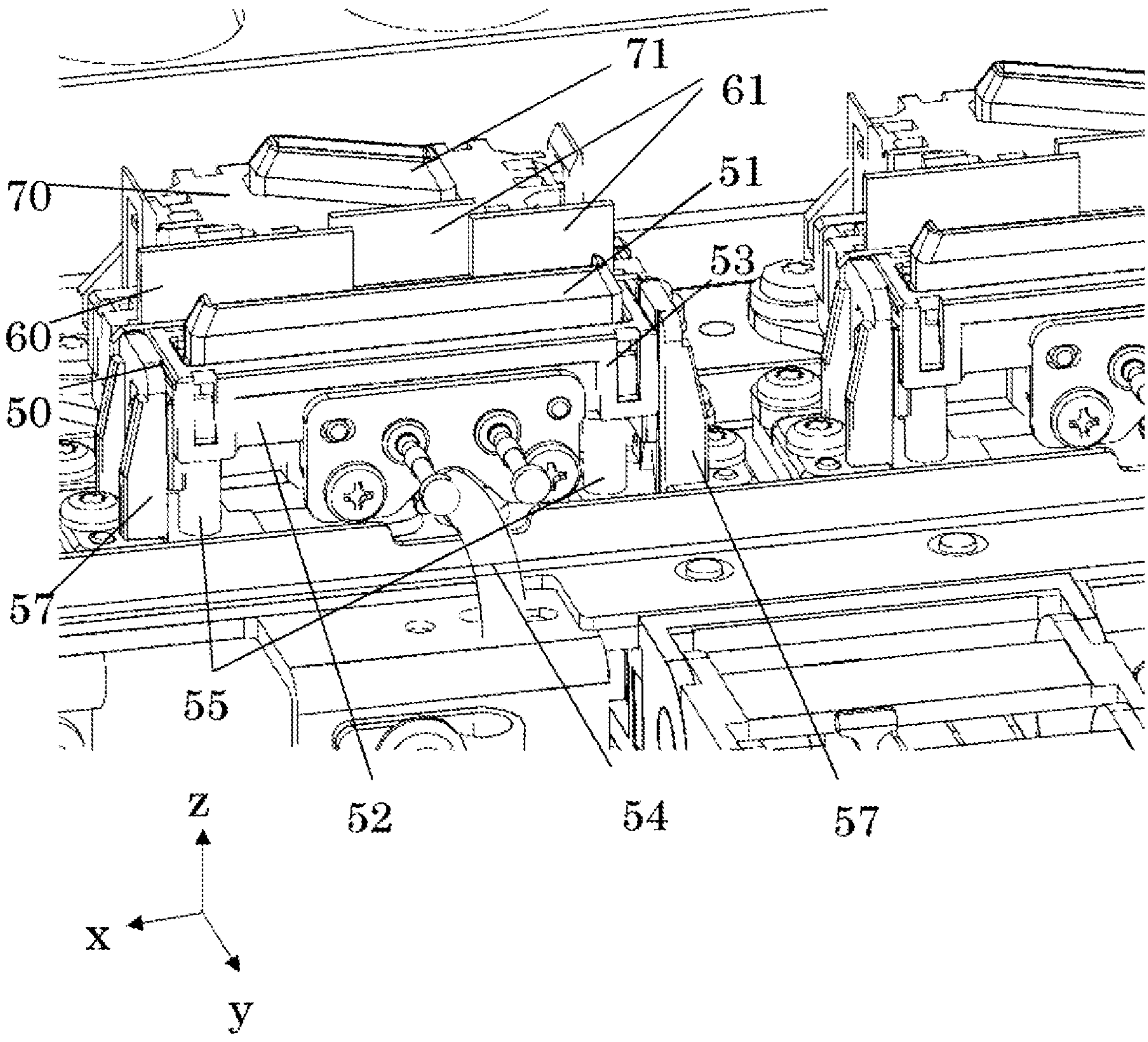
FIG. 6 is a perspective view of a maintenance unit.

FIG. 6 is a perspective view of a part indicated by a broken line in FIG. 5 when seen from an arrow P direction, and shows the configuration of a maintenance unit 40 arranged inside the maintenance tray 17. The maintenance unit 40 has a cleaning-liquid application unit 50 (liquid application head) that applies a cleaning liquid to the nozzle plates 224 of a recording head 22, a liquid removal unit 60 that removes ink, sheet powder, or a cleaning liquid adhering to the recording head 22, and a negative-pressure application unit 70 that applies a negative pressure to the nozzle plates 224 of the recording head 22 and removes ink adhering to a nozzle unit or foam inside an ink flow path.

Figure 7A:
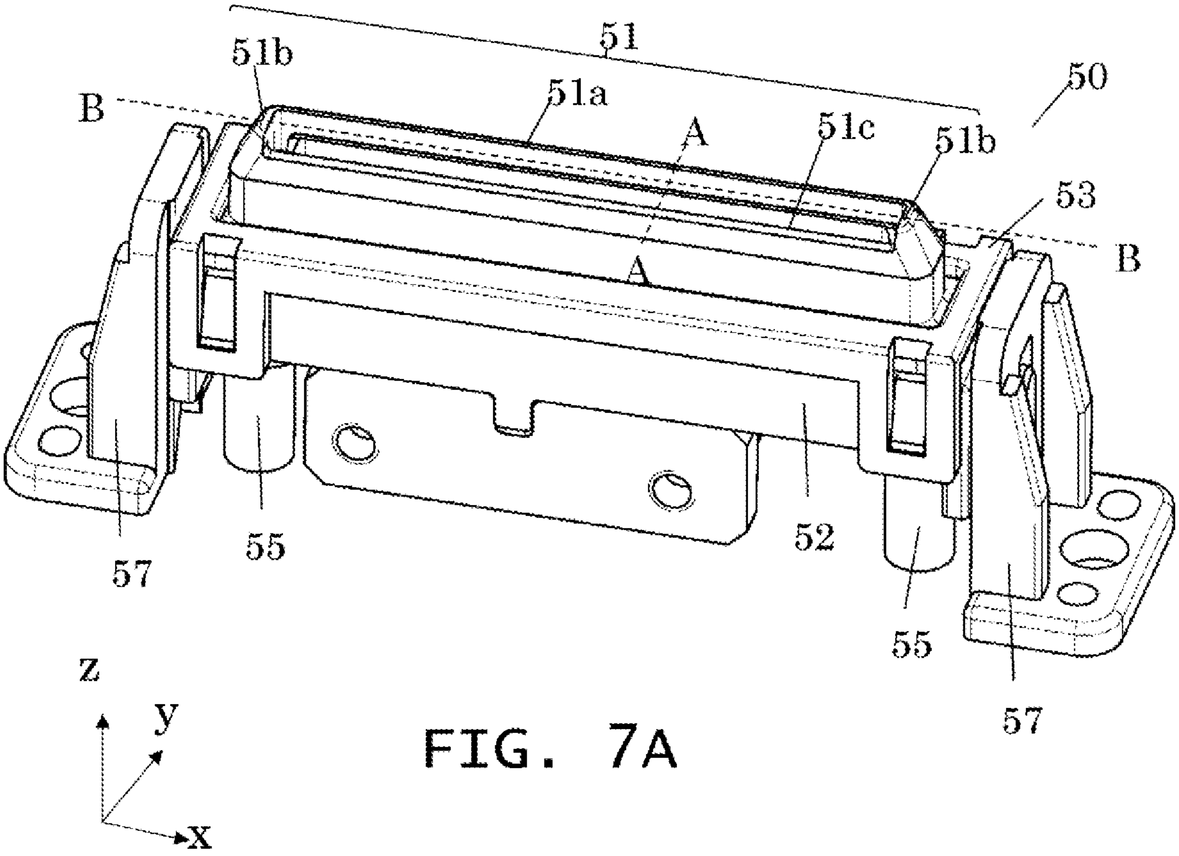
FIG. 7A is a schematic view showing the configuration of a cleaning-liquid application unit.
Figure 7B:
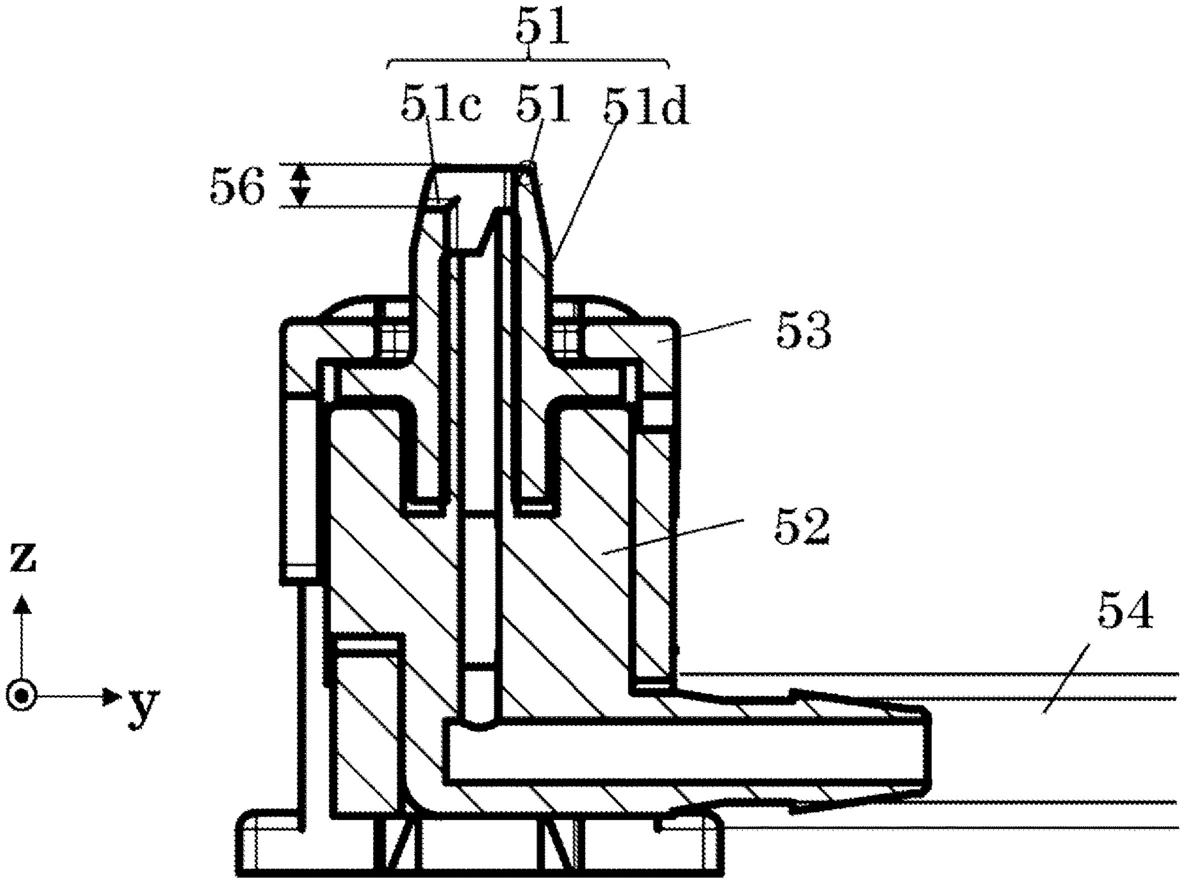
FIG. 7B is another schematic view showing the configuration of the cleaning-liquid application unit.
Figure 7C:
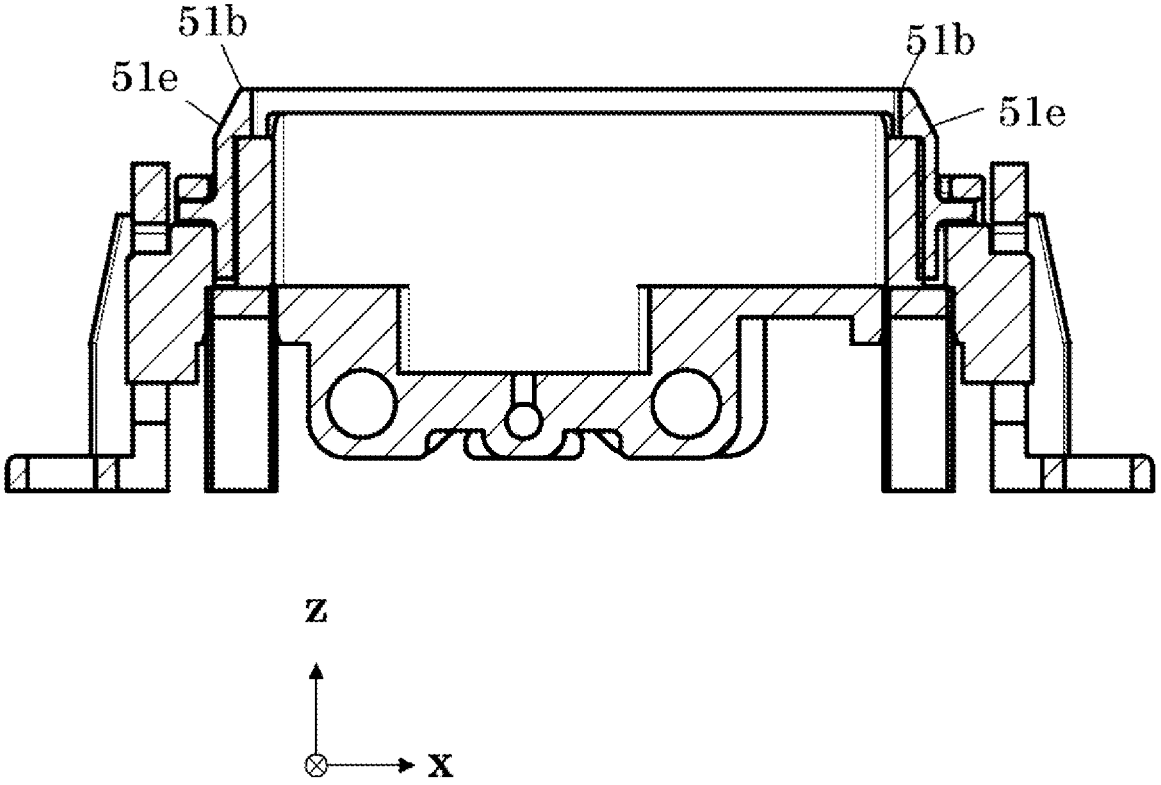
FIG. 7C is another schematic view showing the configuration of the cleaning-liquid application unit.

FIGS. 7A to 7C are schematic views showing the configuration of the cleaning-liquid application unit 50. FIG. 7B shows an A-A cross section of the cleaning-liquid application unit 50 shown in FIG. 7A, and FIG. 7C shows a B-B cross section. As shown in FIG. 7A, the cleaning-liquid application unit 50 has a cleaning-liquid application member 51 having flexibility, a cleaning-liquid application member holder 52 that holds the cleaning-liquid application member 51 and has a flow path that supplies a cleaning liquid to the inside of the cleaning-liquid application member 51, and a cleaning-liquid application member cover 53 that covers the cleaning-liquid application member 51. The cleaning-liquid application member 51 is held between the cleaning-liquid application member holder 52 and the cleaning-liquid application member cover 53. As shown in FIG. 7B, a cleaning-liquid supply tube 54 (liquid supply member) is connected to the cleaning-liquid application member holder 52. A cleaning liquid supplied from the cleaning-liquid supply tube 54 passes through the cleaning-liquid application member holder 52, and is supplied to the nozzle formation surface 223 by the cleaning-liquid application member 51. Thus, a supply flow path of the cleaning liquid is formed. Further, the cleaning-liquid application unit 50 has urging members 55. When the cleaning liquid is being applied to the nozzle formation surface 223, the cleaning-liquid application member 51 is urged and brought into pressure-contact with the nozzle formation surface 223.

Figure 8A:
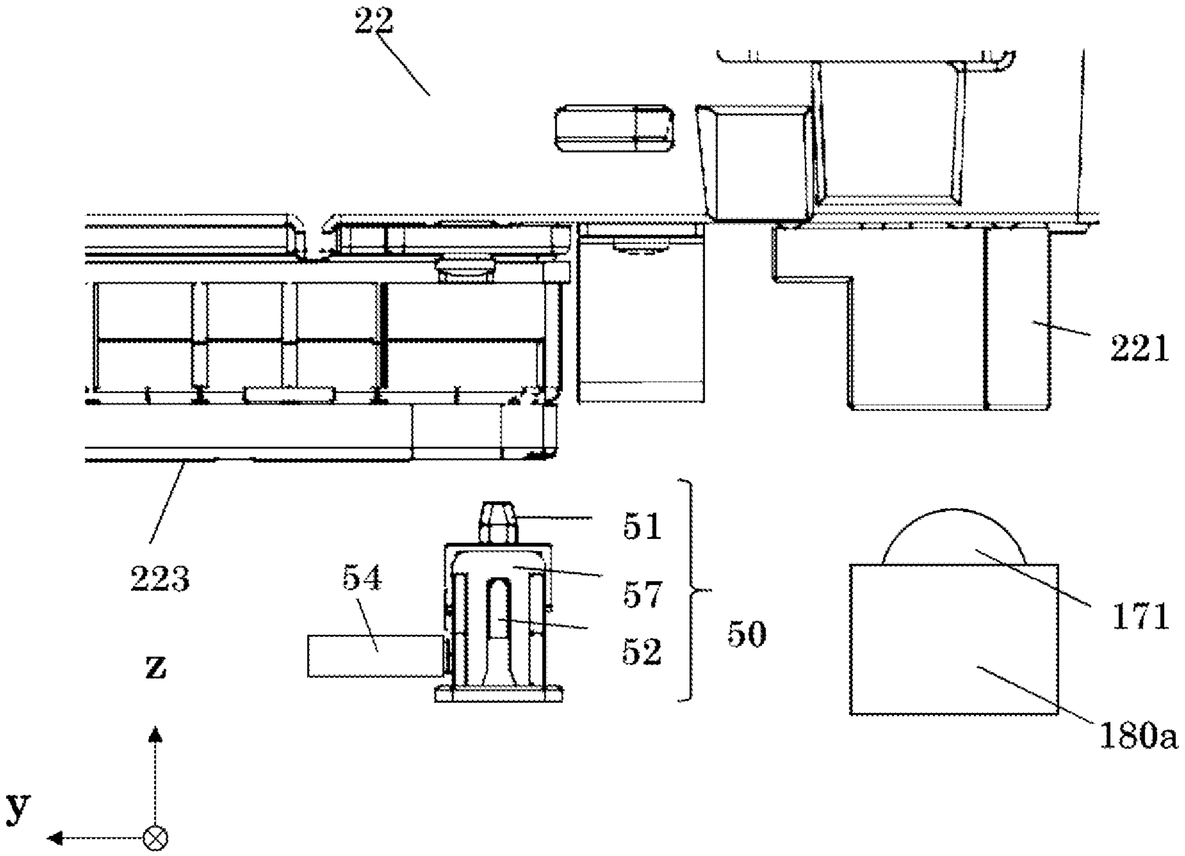
FIG. 8A is a schematic view showing a pressure-contact operation of the cleaning-liquid application unit with respect to the recording head.
Figure 8B:
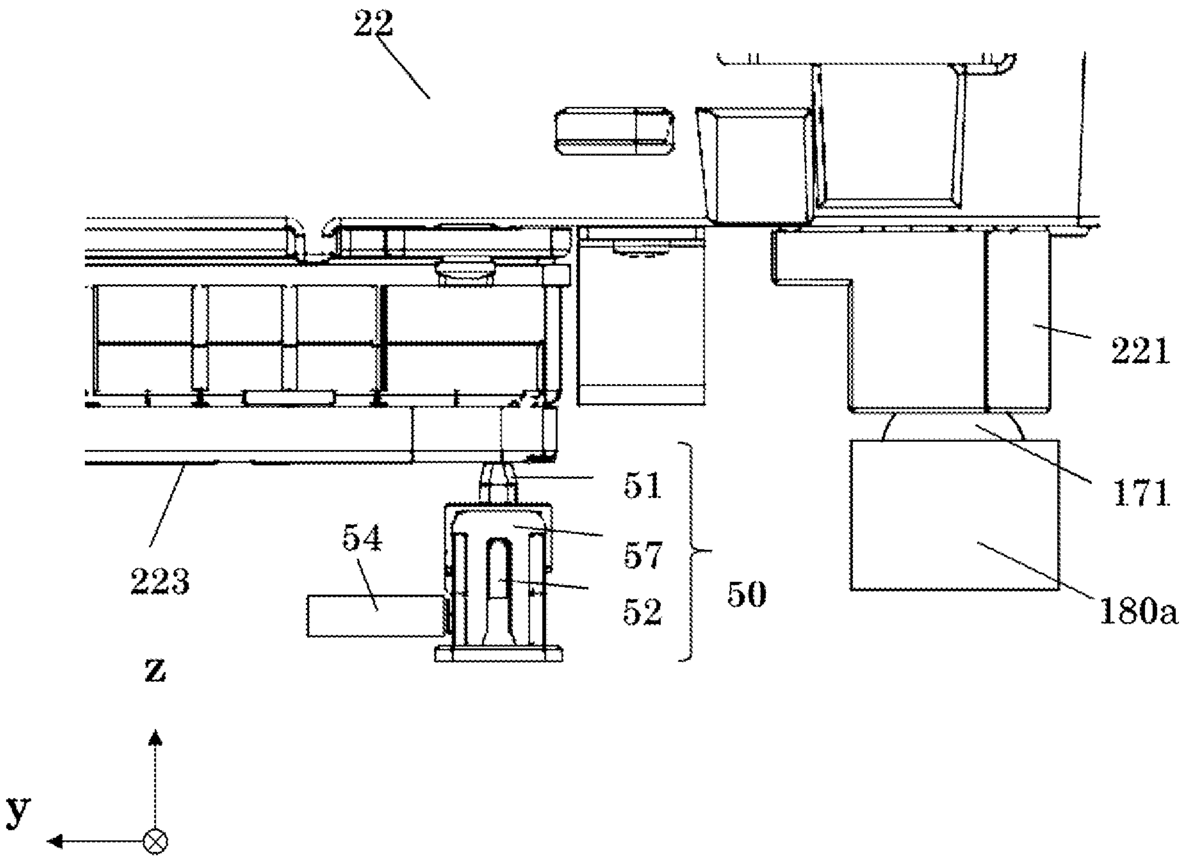
FIG. 8B is another schematic view showing the pressure-contact operation of the cleaning-liquid application unit with respect to the recording head.

FIGS. 8A and 8B are views showing an operation of bringing the cleaning-liquid application unit 50 into pressure-contact with the nozzle formation surface 223 of a recording head 22. FIG. 8A shows a state in which the nozzle formation surface 223 and the cleaning-liquid application unit 50 are separated from each other, and FIG. 8B shows a state in which the cleaning-liquid application unit 50 is brought into pressure-contact with the nozzle formation surface 223. The cleaning-liquid application member holder 52 of the cleaning-liquid application unit 50 is held by a holder guide 57 to be movable in a z-direction. When performing a maintenance operation, the recording head 22 descends in the z-direction by the lifting mechanism described above, and then moves to and stops at a position at which positioning members 221 of the recording head 22 are abutted on the recording-head positioning members 171 of the maintenance tray 17. At this time, the cleaning-liquid application member 51, supported by the cleaning-liquid application member holder 52, is pressed in the z-direction, and brought into pressure-contact with the nozzle formation surface 223 by the urging members 55.

As shown in FIGS. 7A to 7C, the cleaning-liquid application member 51 has a notch at a part of its surface that contacts the nozzle formation surface 223. When a cleaning liquid is applied to the nozzle formation surface 223, a surface 51*a* (first surface) on an upstream side (+Y-direction side) in a cleaning-liquid application direction and surfaces 51*b* (second surfaces) crossing the surface on the upstream side are brought into pressure-contact with the nozzle formation surface 223, whereas a surface 51*c* (third surface) on a downstream side in the cleaning-liquid application direction and the nozzle formation surface 223 have a gap 56 therebetween. In an example shown in the figures, the surface 51*a* on the upstream side has a longer contact length with respect to the nozzle formation surface 223 than the surfaces 51*b* crossing the surface on the upstream side, which makes the cleaning-liquid application member 51 easily follow the surface shape of the nozzle formation surface 223.

Further, the surface 51*a* on the upstream side in the cleaning-liquid application direction that contacts the nozzle formation surface 223 is configured to be thinner than its root portion 51*d* as shown in FIG. 7B, and the surfaces 51*b* crossing the surface on the upstream side are configured to be thinner than their root portions 51*e* as shown in FIG. 7C. According to this configuration, the tip end of the cleaning-liquid application member 51 is thin and easily deforms. Therefore, even when the cleaning-liquid application member 51 is brought into pressure-contact with the nozzle formation surface 223 having unevenness, it is possible to make the cleaning-liquid application member 51 easily follow the unevenness of the nozzle formation surface 223.

Figure 9A:
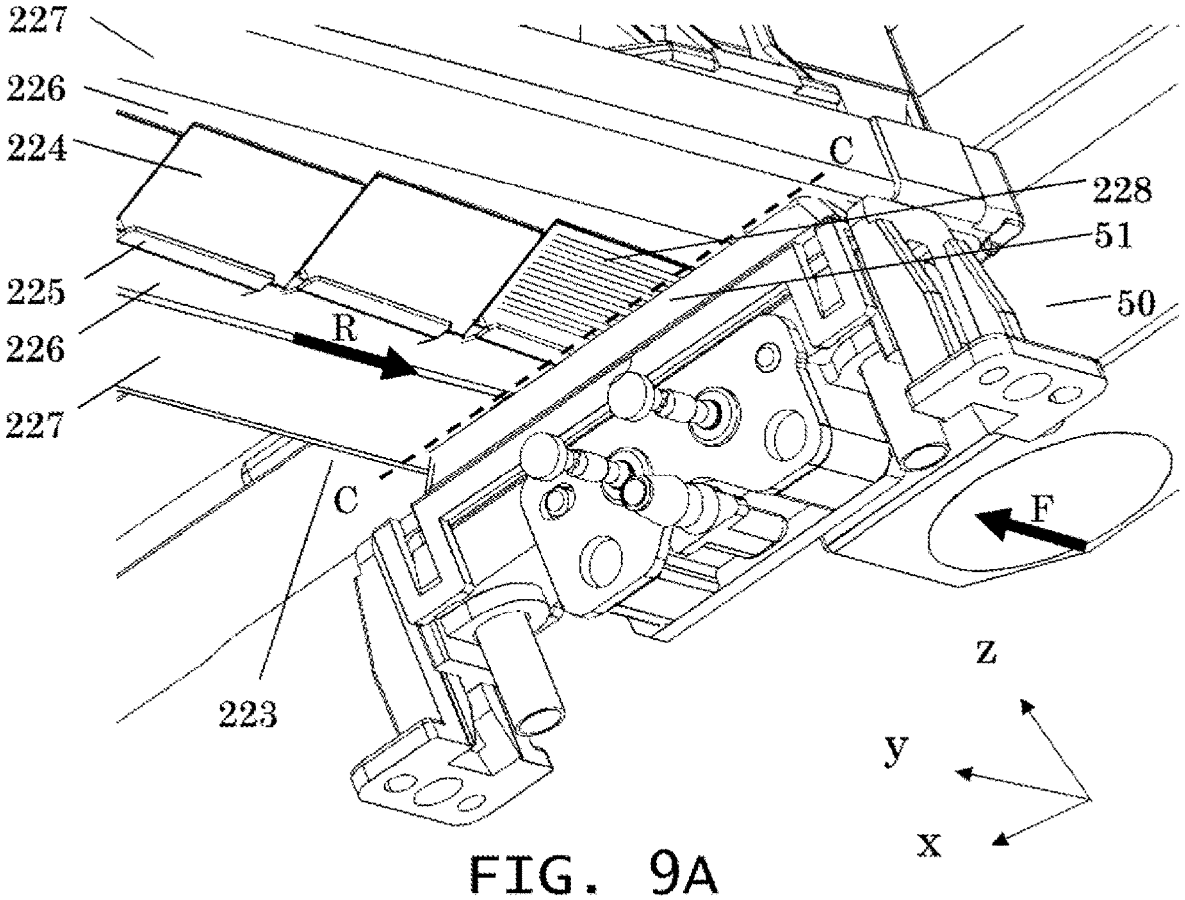
FIG. 9A is a schematic view showing a pressure-contact state of the cleaning-liquid application unit with respect to the recording head.
Figure 9B:
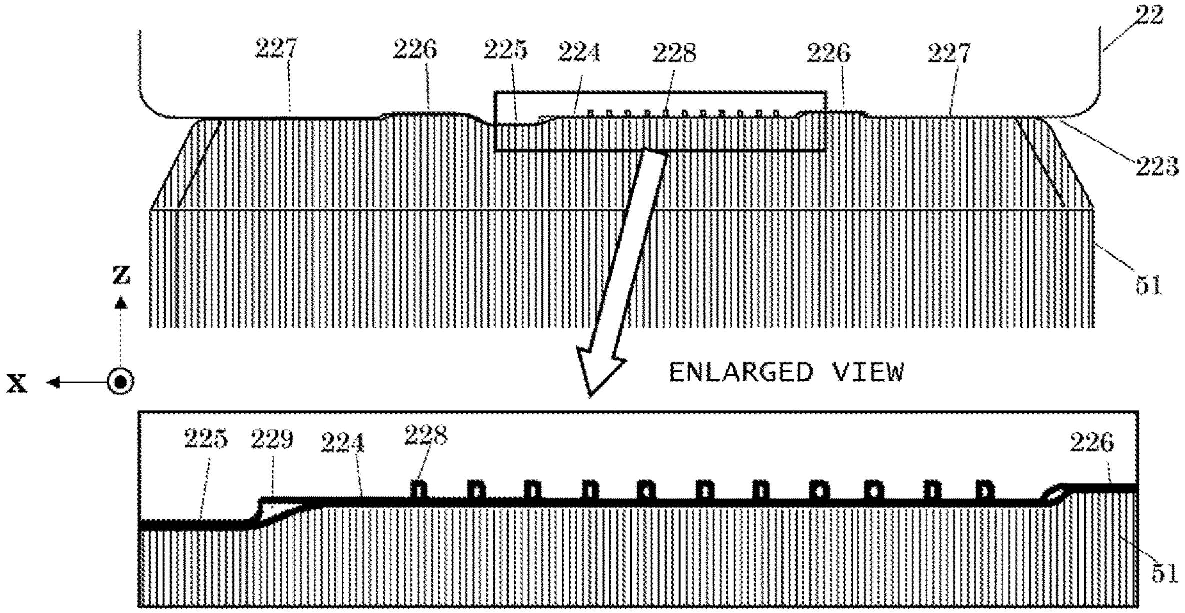
FIG. 9B is another schematic view showing the pressure-contact state of the cleaning-liquid application unit with respect to the recording head.
Figure 9C:
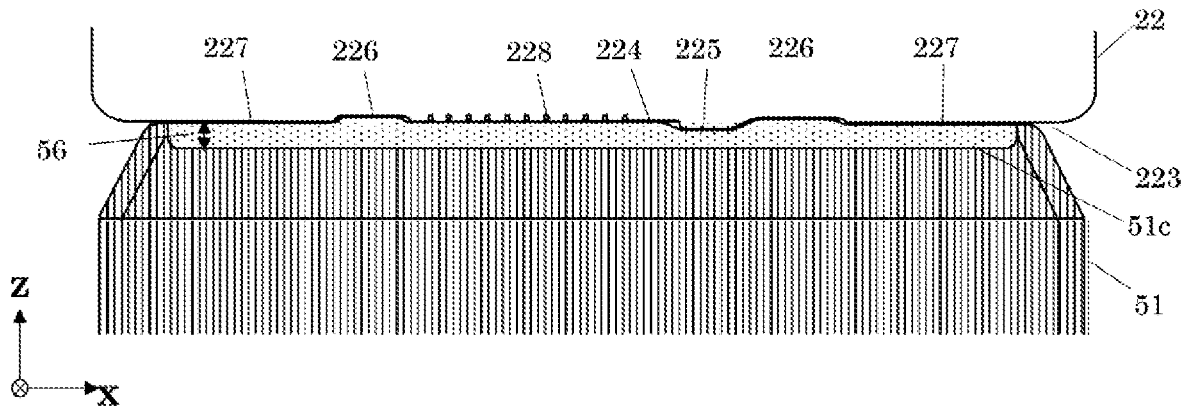
FIG. 9C is another schematic view showing the pressure-contact state of the cleaning-liquid application unit with respect to the recording head.

FIGS. 9A to 9C show a state in which the cleaning-liquid application unit 50 is brought into pressure-contact with the nozzle formation surface 223. FIG. 9A is a view showing a state in which a cleaning liquid is applied to the nozzle formation surface 223 of a recording head 22 from the cleaning-liquid application unit 50. The nozzle plates 224 and protruded sealing materials 225 are arranged at a substantially center of the nozzle formation surface 223, and a face cover 227 is arranged at an outer peripheral portion of the nozzle formation surface 223. Further, a sealing material 226 is arranged between the nozzle plates 224 and the face cover 227, and the nozzle formation surface 223 has a shape having unevenness in the z-direction since its height is different between portions.

In FIG. 9B, an upper part shows a C-C pressure-contact cross section of the nozzle formation surface 223 and the cleaning-liquid application unit 50 when seen from an arrow-R direction in FIG. 9A, and a lower part shows an enlarged view of a portion surrounded by a solid line. FIG. 9C shows a C-C pressure-contact cross section of the nozzle formation surface 223 and the cleaning-liquid application unit 50 when seen from an arrow-F direction in FIG. 9A.

The cleaning-liquid application member 51 is formed to be thin at its tip end and to have excellent followability to unevenness even in places having a steep step such as connecting portions between the nozzle plates 224 and the protruded sealing materials 225, whereby a gap 229 generated between the nozzle plate and the protruded sealing materials and the cleaning-liquid application member becomes slight. According, it is also possible to bring the cleaning-liquid application member 51 into pressure-contact with nozzle rows 228 adjacent to the protruded sealing materials 225 and to reliably apply a cleaning liquid to the nozzle rows 228. Further, the cleaning-liquid application member 51 has a taper shape in cross section at its tip-end portion. With the employment of the taper shape, the tip end portion of the cleaning-liquid application member 51 is expanded as being distant from the surfaces contacting the nozzle formation surface 223. Therefore, the tip end of the cleaning-liquid application member 51 is prevented from falling when the cleaning-liquid application member 51 is brought into pressure-contact with the nozzle formation surface 223. As a result, the gap 56 generated between the nozzle formation surface 223 and the surface 51*c* on the downstream side in the cleaning-liquid application direction of the cleaning-liquid application member 51 is maintained. According to this configuration, the cleaning liquid applied to the nozzle formation surface 223 is prevented from leaking to an upstream side in an advancing direction of the cleaning-liquid application unit 50 and a direction perpendicular to the advancing direction, and overflows only from the gap 56 described above. Therefore, it is possible to apply a required amount of the cleaning liquid only to the nozzle formation surface.

Next, the configuration of the liquid removal unit 60 will be described using FIG. 6. The liquid removal unit 60 is provided with a plurality of blades 61 having flexibility. In a case when the nozzle formation surface 223 has unevenness, it is possible to reduce a remaining liquid amount on the nozzle formation surface by optimizing the width, number, and arrangement of the blades 61 in accordance with an unevenness shape. Note that the number of the blades 61 may also be one. Further, a liquid removal unit is not limited to the blades 61, but webs or porous rollers may be brought into pressure-contact with the nozzle formation surface 223 to perform removal as another configuration.

Figure 10:
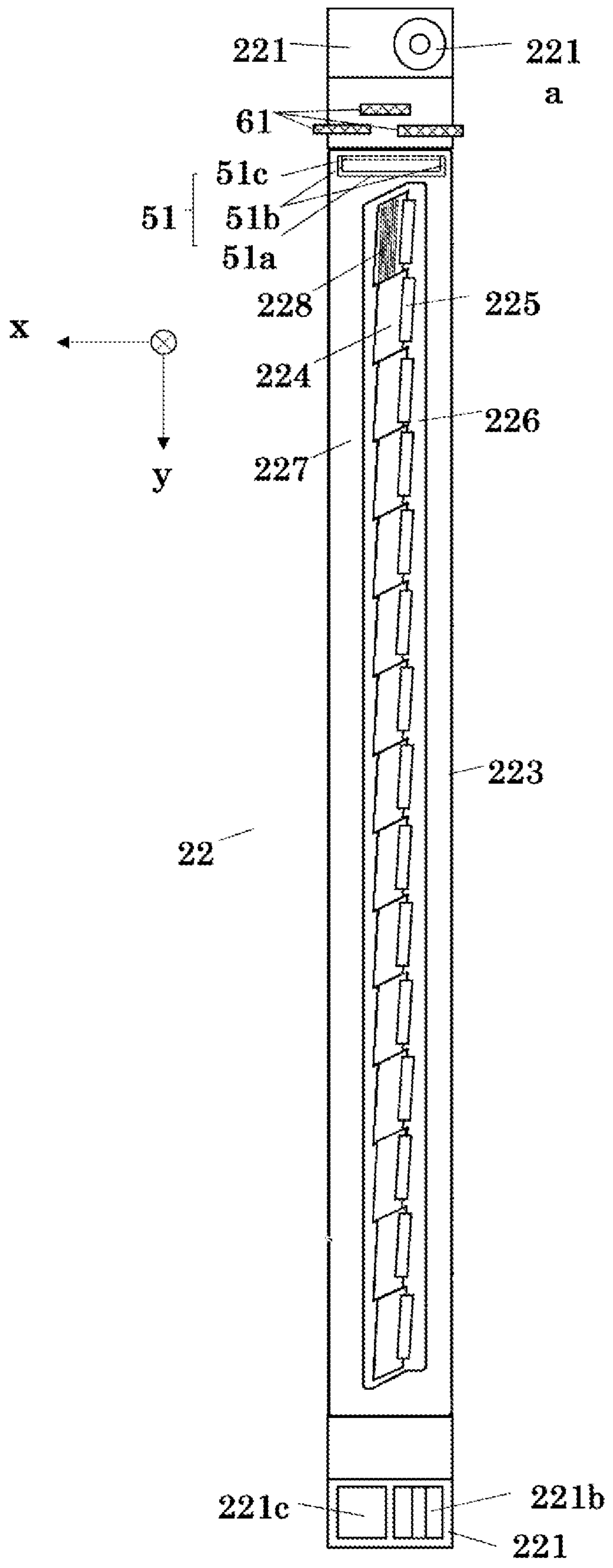
FIG. 10 is a schematic view showing a cleaning position of a maintenance member with respect to the nozzle formation surface.

FIG. 10 is a view of the nozzle formation surface 223 of a recording head 22 when seen from its lower side in the z-direction. Note that positions in the x-direction of the cleaning-liquid application member 51 and the blades 61 with respect to the nozzle formation surface 223 are shown in an upper part of FIG. 10. A pressure-contact width of the cleaning-liquid application member 51 with respect to the nozzle formation surface 223 is configured to be shorter than a horizontal width of the nozzle formation surface 223. That is, a liquid application width at which the cleaning-liquid application member 51 applies a liquid is narrower than a width in a direction (perpendicular direction in the figure) crossing a liquid application direction of the nozzle formation surface 223. In the cleaning-liquid application member 51, the surface 51*a* on the upstream side in the cleaning-liquid application direction and the surfaces 51*b* crossing the surface on the upstream side are brought into pressure-contact with the nozzle formation surface 223, whereby the gap 56 between the surface 51*c* on the downstream side in the cleaning-liquid application direction of the cleaning-liquid application member 51 and the nozzle formation surface 223 is maintained.

Further, the blades 61 provided in the liquid removal unit 60 are formed to have a wider width than the cleaning-liquid application member 51 and the nozzle formation surface 223. At this time, a liquid removal width that is a width at which the liquid removal unit removes a liquid is wider than the liquid application width of the cleaning-liquid application member 51 in the direction crossing the liquid application direction. Note that, in a case when the liquid removal unit is composed of the plurality of blades 61 as in the example shown in the figures, the liquid removal width that corresponds to the whole width of the plurality of blades 61 is only required to be wider than the liquid application width. According to this configuration, a cleaning-liquid application range with respect to the nozzle formation surface 223 is limited to the nozzle formation surface 223, and adhesion of the liquid to lateral surfaces of the recording head 22 is reduced. Further, since the cleaning liquid applied to the nozzle formation surface 223 is removed over the whole width in the x-direction of the nozzle formation surface 223, it is possible to prevent contamination on a product due to adhesion of a remaining liquid to the product on the nozzle formation surface 223.

Figure 11:
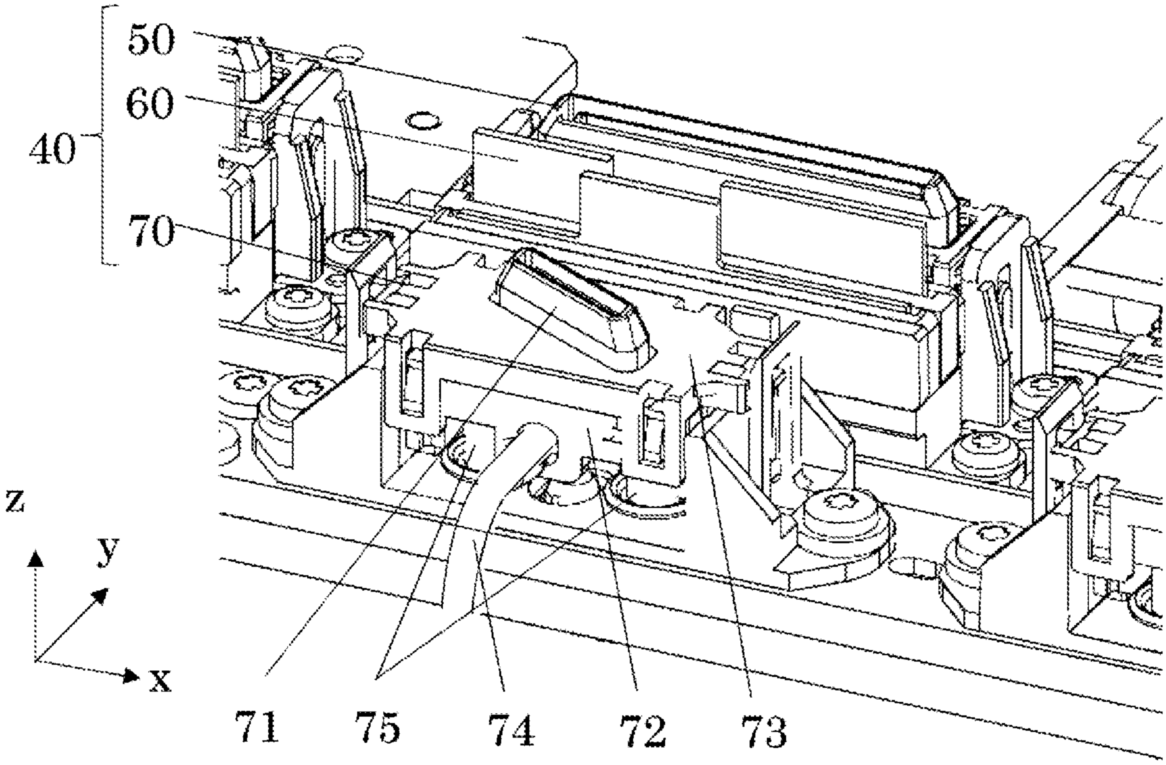
FIG. 11 is a perspective view showing the configuration of a negative-pressure application unit.

FIG. 11 is a perspective view showing the configuration of the negative-pressure application unit 70. The negative-pressure application unit 70 has a negative-pressure application member 71 having flexibility, a negative-pressure application member holder 72 that holds the negative-pressure application member 71 and has a flow path that makes the pressure inside the negative-pressure application member 71 negative, and a negative-pressure application member cover 73. The negative-pressure application member 71 is held between the negative-pressure application member holder 72 and the negative-pressure application member cover 73. A negative-pressure supply tube 74 is connected to the negative-pressure application member holder 72. A negative pressure supplied from the negative-pressure supply tube 74 passes through the negative-pressure application member holder 72, and is applied to the nozzle formation surface 223 by the negative-pressure application member 71. Further, the negative-pressure application unit 70 has urging members 75. During application of the negative pressure to the nozzle formation surface 223, the negative-pressure application member 71 is brought into pressure-contact with the nozzle formation surface 223.

According to this configuration, it is possible to create a substantially adhering state between the nozzle formation surface 223 and the negative-pressure application member 71. As a result, fixed ink is sucked from the nozzle plates 224, and nozzle clogging, or the like, is eliminated.

Positioning of Recording Heads with Respect to Maintenance Tray

Figure 12A:
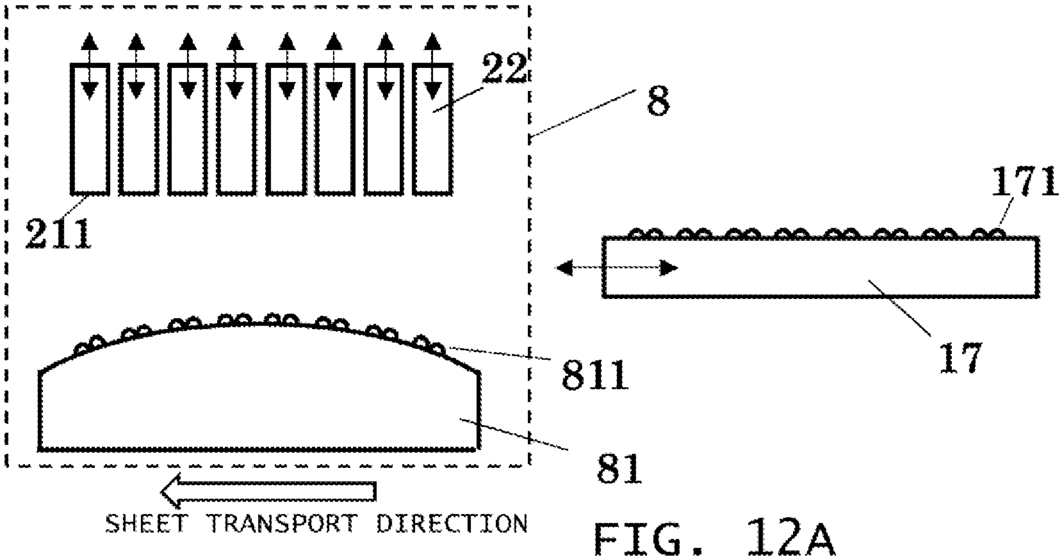
FIGS. 12A to 12C are schematic views showing a positioning operation of the recording head with respect to the maintenance tray.
Figure 12B:
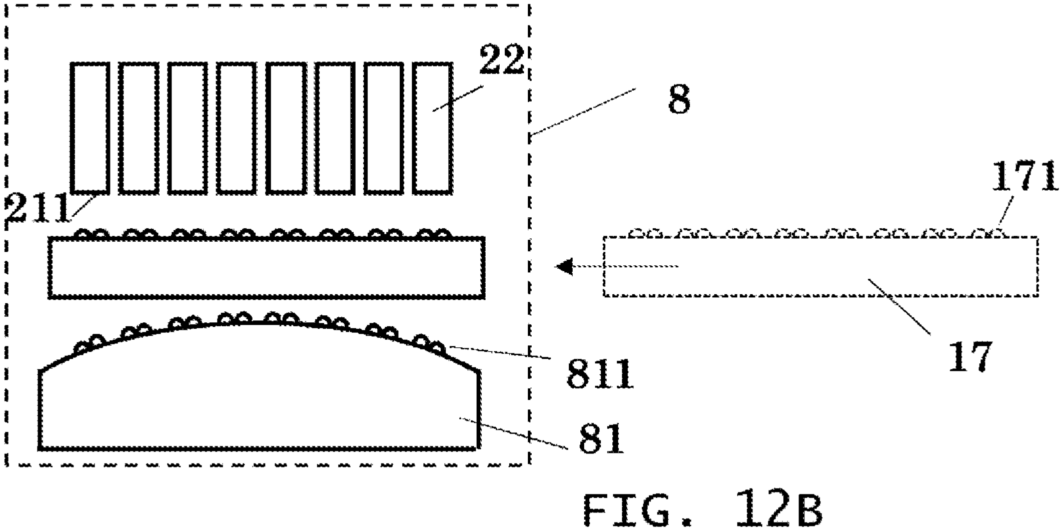
Figure 12C:
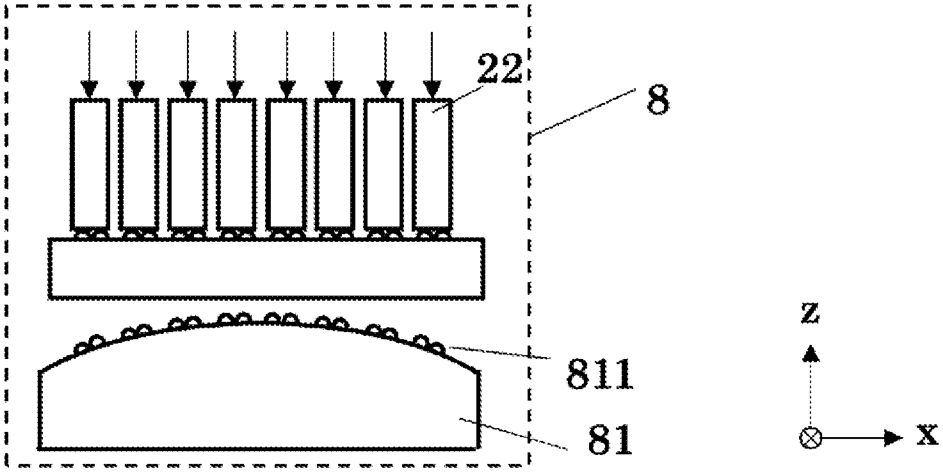

FIGS. 12A to 12C are schematic views showing an operation of performing positioning of the recording heads 22 with respect to the maintenance tray 17. During a recording operation, the maintenance tray 17 is retracted to an apparatus sheet-feeding side with respect to the recording unit 8. When a maintenance operation for the recording heads 22 is performed, the recording heads 22 move from the sheet-transport-unit housing 81 to an upper retracting position shown in FIG. 12A by the recording-head lifting mechanism described above. Then, as shown in FIG. 12B, the maintenance tray 17 moves from a retracting position to a position under the recording heads 22 by a driving mechanism not shown and a rail. The maintenance tray 17 includes the recording-head positioning members 171, and the recording heads 22 have the positioning members 221 at their lower parts. When the recording heads 22 descend, the recording heads 22 are positioned with respect to the maintenance tray 17 as shown in FIG. 12C.

Figure 13A:
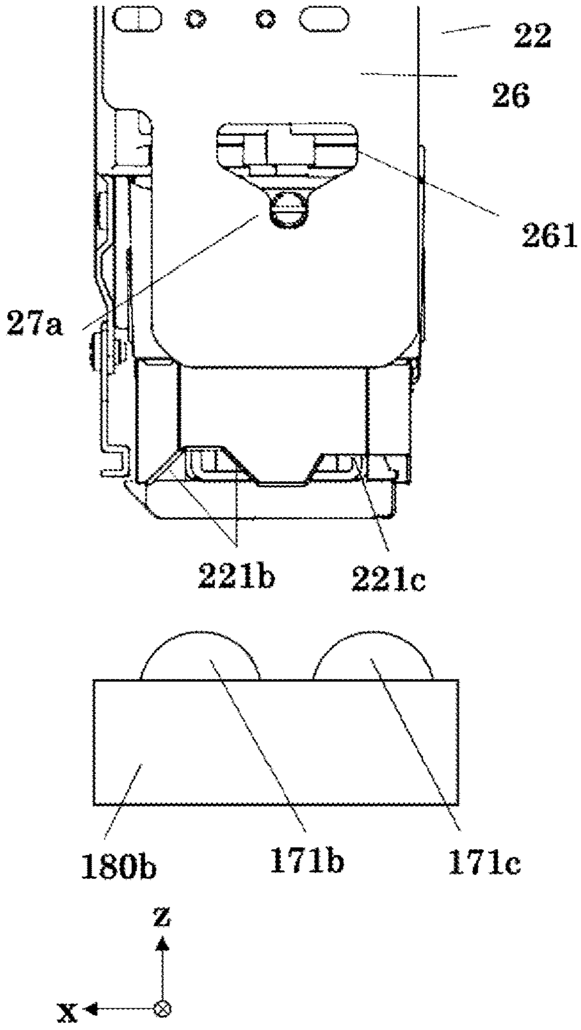
FIGS. 13A and 13B are schematic views showing a state in which the maintenance tray and the recording head are separated from each other.
Figure 13B:
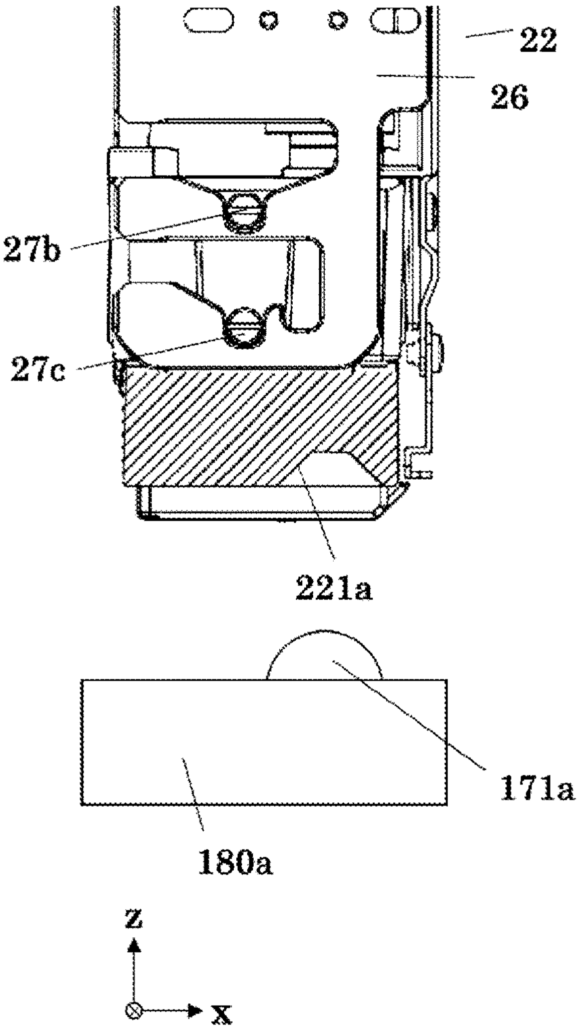
Figure 14A:
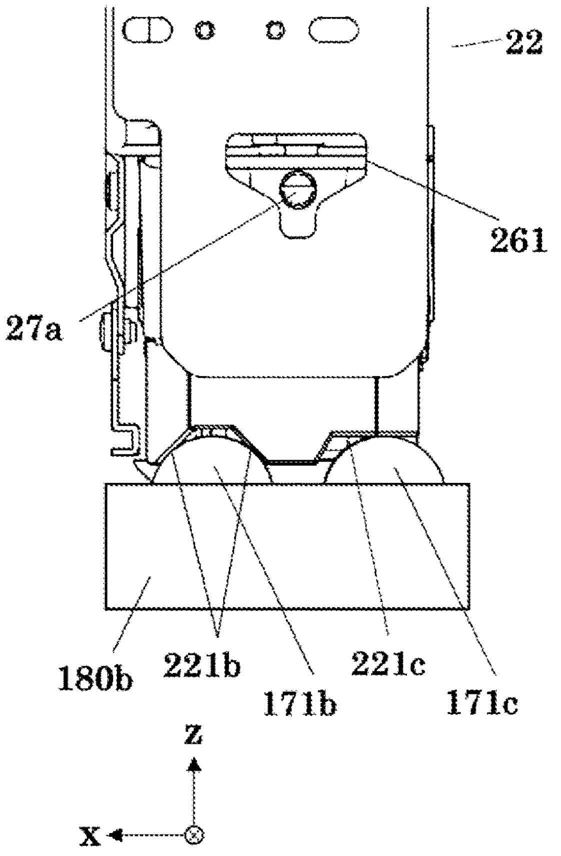
FIGS. 14A and 14B are schematic views showing a state in which positioning of the recording head with respect to the maintenance tray is completed.
Figure 14B:
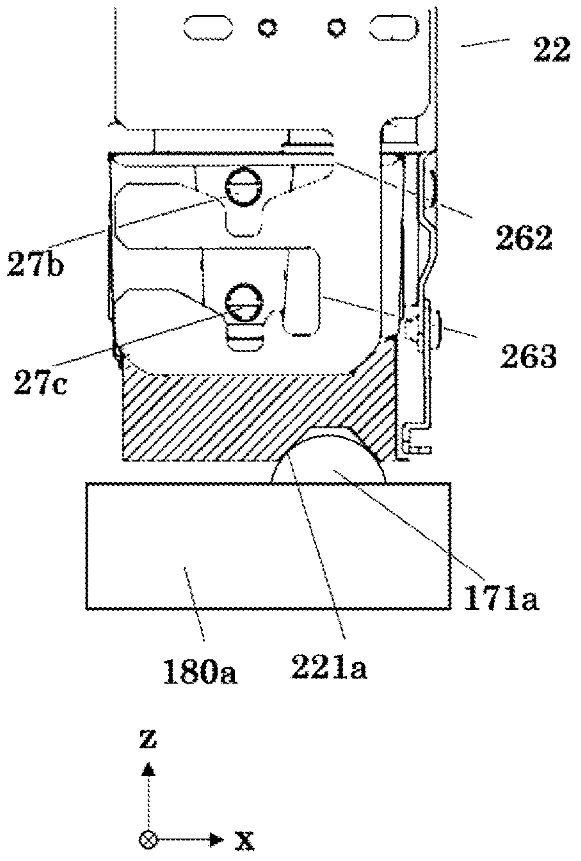

FIGS. 13A and 13B and FIGS. 14A and 14B show a state in which the positioning members 221 of a recording head 22 are separated from the recording-head positioning members 171 of the maintenance tray 17 and a state in which positioning of the positioning members 221 of the recording head 22 with respect to the recording-head positioning members 171 of the maintenance tray 17 is completed, respectively. Note that FIGS. 13A and 14A are views of the maintenance tray 17 and the recording head 22 when seen from an apparatus rear-surface side, and FIGS. 13B and 14B are views of the maintenance tray 17 and the recording head 22 when seen from an apparatus front-surface side. When the recording-head holding unit 26 descends, the positioning members 221 of the recording head 22 contact the recording-head positioning members 171 of the maintenance tray

17. When the recording-head holding unit 26 further descends, a first pin 27*a*, a second pin 27*b*, and a third pin 27*c* of the recording head 22 are separated from a first hole 261, a second hole 262, and a third hole 263 of the recording-head holding unit 26, respectively. At this time, the positioning members 221 of the recording head 22 are equalized with the recording-head positioning members 171 of the maintenance tray 17, and the recording head 22 is positioned with respect to the maintenance tray 17 with high accuracy.

Operation Example of Maintenance Unit

FIGS. 15A to 15H are views showing an operation example of the maintenance unit 40. In FIGS. 15A to 15H, cross-sectional views in a yz-direction of the maintenance tray 17 and a recording head 22 in respective cleaning states are shown. The maintenance unit 40 is divided into a first stage 45 on which the cleaning-liquid application unit 50 and the liquid removal unit 60 are mounted and a second stage 46 on which the negative-pressure application unit 70 is mounted.

FIG. 15A shows a state in which the maintenance tray 17 is separated from the recording head 22, and the cleaning-liquid application unit 50 is arranged at a cleaning start position in the y-direction that is a cleaning direction.

FIG. 15B shows a state in which the positioning members 221 of the recording head 22 are landed on and positioned with respect to the recording-head positioning members 171 of the maintenance tray 17. In the process of positioning the recording head 22 on the maintenance tray 17, the cleaning-liquid application unit 50 is pressed in the z-direction by the descending recording head 22. Since the cleaning-liquid application unit 50 has the urging members 55, the cleaning-liquid application member 51 is brought into pressure-contact with the recording head 22 at this time. After that, supply of a cleaning liquid to the cleaning-liquid application unit 50 is started before the start of movement of the first stage in the y-direction.

FIG. 15C shows a state in which the first stage 45 is moved in the y-direction and a cleaning operation on the nozzle formation surface 223 of the recording head 22 is completed. During the cleaning of the nozzle formation surface 223, the cleaning liquid is evenly applied to the nozzle formation surface 223 of the recording head 22 by the cleaning-liquid application unit 50, and then fixed ink and the cleaning liquid are removed from the nozzle formation surface 223 by the liquid removal unit 60. After the complete of the cleaning operation, the supply of the cleaning liquid to the cleaning-liquid application unit 50 is stopped.

FIG. 15D is a view showing a state in which the recording head 22 is retracted to an upper side in the z-direction when the first stage 45 is at a cleaning complete position. FIG. 15E is a view showing a state in which the second stage 46 on which the negative-pressure application unit 70 is mounted is moved to the cleaning start position. The negative-pressure application unit 70 is brought into pressure-contact with the nozzle formation surface 223 after the cleaning operation is completed by the first stage 45. At this time, by bringing the negative-pressure application unit 70 into pressure-contact with the nozzle formation surface 223 in the z-direction, it is possible to stabilize a pressure-contact posture of the negative-pressure application unit 70 with respect to the nozzle formation surface 223.

FIG. 15F shows a state in which the recording head 22 is positioned with respect to the negative-pressure application unit 70. In the process of positioning the recording head 22 on the maintenance tray 17, the negative-pressure application unit 70 is pressed in the z-direction by the descending recording head 22. Since the negative-pressure application unit 70 has the urging members 75, the negative-pressure application member 71 is brought into pressure-contact with the recording head 22 at this time. After that, a negative pressure is applied to the negative-pressure application unit 70 before the start of movement of the second stage 46 in the y-direction.

FIG. 15G shows a state in which the negative-pressure application unit 70 is moved to the cleaning complete position. In the process of moving the second stage 46 in the y-direction, the negative pressure is applied to the nozzle plates 224 of the nozzle formation surface 223 to perform removal of fixed ink from the nozzles and removal of foam inside the ink flow path. After the second stage 46 is moved to the cleaning complete position, a negative-pressure application operation for the negative-pressure application unit 70 is stopped. As shown in FIG. 15H, the recording head 22 is retracted in the z-direction, and the first stage 45 and the second stage 46 are moved to a position in FIG. 15A that is an initial position.

By the cleaning operation described above, it is possible to substantially evenly apply a cleaning liquid to all the nozzles of the nozzle formation surface 223 and to remove the applied cleaning liquid over the whole width of the nozzle formation surface 223 even when the nozzle formation surface 223 has an unevenness shape in the recording apparatus 1 according to this embodiment.

Second Embodiment

FIGS. 16A to 16J are cross-sectional views in a yz-direction showing an operation inside a maintenance tray 17 according to a second embodiment. A cleaning-liquid application unit 50, a liquid removal unit 60, and a negative-pressure application unit 70 included in a maintenance unit 40 are mounted on different stages, and independently movable in a y-direction by a movement mechanism (not shown). In the first embodiment, the cleaning-liquid application unit 50 and the liquid removal unit 60 concurrently move with respect to the recording head 22. On the other hand, a cleaning-liquid application unit 50 and a liquid removal unit 60 are enabled to separately move with respect to a recording head 22 by the above configuration in the second embodiment.

Figure 16A:
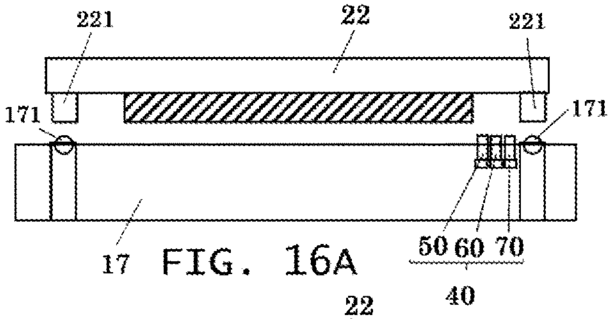
FIGS. 16A to 16J are schematic views showing a second embodiment of a maintenance unit.

FIG. 16A shows a state in which the maintenance tray 17 is separated from the recording head 22, and the maintenance unit 40 is arranged at a standby position in the maintenance tray 17.

Figure 16B:
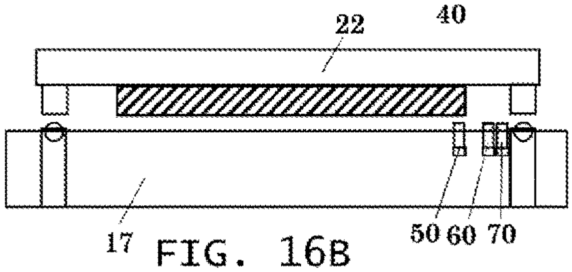
Figure 16C:
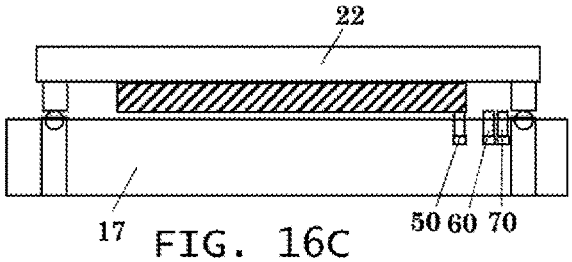

FIG. 16B shows a state in which the cleaning-liquid application unit 50 is moved to a cleaning start position when the cleaning-liquid application unit 50 is caused to perform an operation on a nozzle formation surface 223. FIG. 16C shows a state in which the recording head 22 is positioned with respect to the maintenance tray 17, and the cleaning-liquid application unit 50 is brought into pressure-contact with the nozzle formation surface 223. Since the cleaning-liquid application unit 50 has urging members 55, a cleaning-liquid application member 51 is brought into pressure-contact with the recording head 22 at this time. After that, supply of a cleaning liquid to the cleaning-liquid application unit 50 is started before the start of movement of a stage on which the cleaning-liquid application unit 50 is mounted in the y-direction.

Figure 16D:
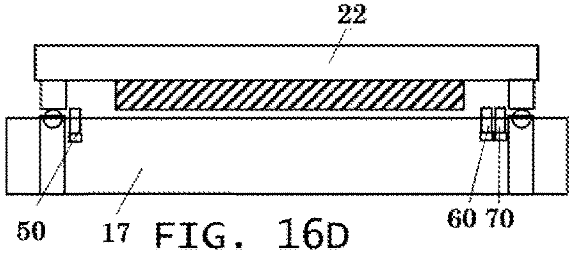

FIG. 16D shows a state in which a cleaning-liquid application operation by the cleaning-liquid application unit 50 is completed. During application of the cleaning liquid to the nozzle formation surface 223, the cleaning liquid is evenly applied to the nozzle formation surface 223 of the recording head 22 by the cleaning-liquid application unit 50. After the movement of the stage to a maintenance complete position, the supply of the cleaning liquid to the cleaning-liquid application unit 50 is stopped.

Figure 16E:
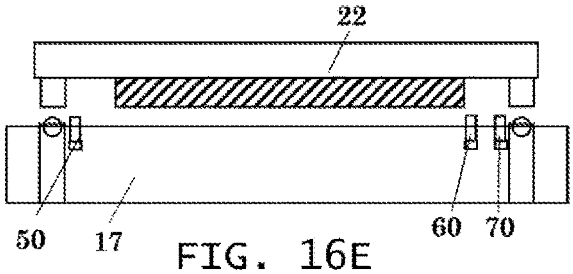
Figure 16F:
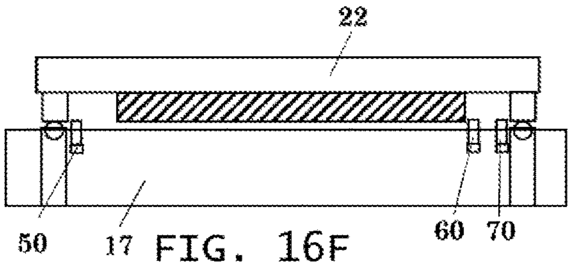
Figure 16G:
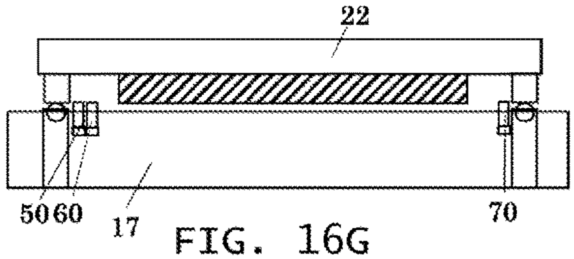

FIG. 16E is a view showing a state in which the recording head 22 is separated from the maintenance tray 17 to shift to a next cleaning process. FIG. 16F is a view showing a state in which a stage is moved to a cleaning start position of the liquid removal unit 60. FIG. 16G is a view showing a state in which the liquid removal unit 60 is moved to a liquid removal complete position. When the liquid removal unit 60 is moved in the y-direction in a state of being brought into pressure-contact with the nozzle formation surface 223, the cleaning liquid and fixed ink are removed from the nozzle formation surface 223. In a case when the liquid removal unit 60 has a blade shape as shown in FIG. 6, a position shifted in the y-direction from the nozzle formation surface 223 as shown in FIG. 6 is defined as a liquid removal start position, whereby it is possible to control a deflecting direction when blades contact the nozzle formation surface.

However, a liquid removal shape is not limited to the blade shape, and the liquid removal start position may be a position on a projection surface of the nozzle formation surface 223. Further, since the cleaning-liquid application unit 50 and the liquid removal unit 60 are enabled to independently perform an operation on the nozzle formation surface, it is also possible to remove strong fixed ink adhering to the nozzle formation surface 223 by causing the cleaning liquid to act on the nozzle formation surface 223 for a long period of time.

Figure 16H:
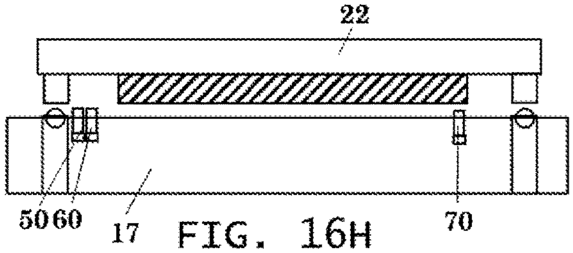
Figure 16I:
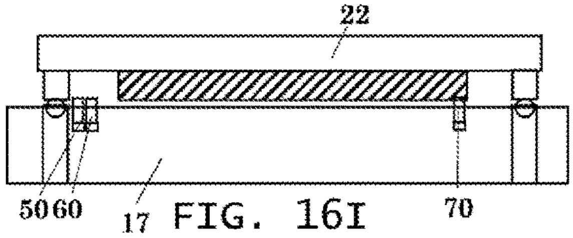
Figure 16J:
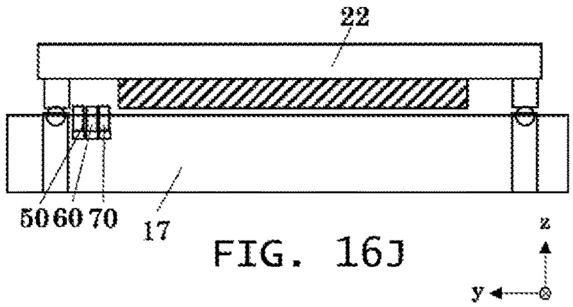

FIG. 16H shows a state in which the recording head 22 is retracted from the maintenance tray 17, and the negative-pressure application unit 70 is moved to the cleaning start position. Further, FIG. 16I shows a state in which the negative-pressure application unit 70 is brought into pressure-contact with the nozzle formation surface 223. FIG. 16J shows a state in which a negative-pressure application operation for the nozzle formation surface 223 is completed.

Since the negative-pressure application unit 70 has urging members 75, a negative-pressure application member 71 is brought into pressure-contact with the recording head 22. After that, a negative pressure is applied to the negative-pressure application unit 70 before the start of movement of a stage on which the negative-pressure application unit 70 is mounted in the y-direction. During the movement of the negative-pressure application unit 70 in the y-direction, the negative pressure is applied to the nozzle formation surface 223.

By the cleaning operation described above, it is possible to substantially evenly apply the cleaning liquid to all the nozzles of the nozzle formation surface 223 and to remove the applied cleaning liquid from the nozzle formation surface 223 even when the nozzle formation surface 223 has an unevenness shape.

In this embodiment, an example of performing cleaning on the nozzle formation surface 223 in the order described above is shown. However, since each of the cleaning-liquid application unit 50, the liquid removal unit 60, and the negative-pressure application unit 70 included in the maintenance unit 40 is independently movable, it is possible to perform cleaning on the nozzle formation surface 223 in an arbitrary order.

The present invention is not limited to the first embodiment or the second embodiment. For example, webs or porous rollers may be brought into pressure-contact with the nozzle formation surface 223 to perform removal as a unit that removes a cleaning liquid from the nozzle formation surface 223 after application of the cleaning liquid.

In a conventional recording apparatus, there has been a problem that, when a cleaning liquid is applied to a recording head having nozzles formed near its unevenness region to perform cleaning, the application of the cleaning liquid to all the nozzles is difficult, and an amount of the cleaning liquid needed to be supplied becomes great in proportion to an amount of the cleaning liquid needed to perform the cleaning on a nozzle formation surface. In view of this, since a cleaning-liquid application unit and a liquid removal unit are arranged as separate bodies in the present invention, it is possible to apply a desired amount of a cleaning liquid to a nozzle formation surface. Further, the cleaning liquid application unit is a flexible member having a notch, and configured to be brought into pressure-contact with the nozzle formation surface. Therefore, a gap is generated only on a downstream side in an advancing direction, which makes it possible to apply a required amount of the cleaning liquid to clean the nozzle formation surface while preventing the cleaning liquid from overflowing on an upstream side in the advancing direction or a direction perpendicular to the advancing direction. Accordingly, when an ink ejection surface has an unevenness region and nozzles are formed near the unevenness region, it is possible to provide a maintenance configuration that is capable of applying a cleaning liquid to all nozzles and removing the liquid adhering to the vicinity of the nozzles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cleaning apparatus for a recording head that ejects ink onto a recording medium, the cleaning apparatus comprising:

a liquid application head configured to apply a liquid to a nozzle formation surface of the recording head; and a liquid removal unit configured to remove the liquid from the nozzle formation surface, wherein the liquid application head has a liquid application member having flexibility and having a first surface on an upstream side in a liquid application direction, a second surface crossing the first surface, and a third surface on a downstream side in the liquid application direction, the first surface and the second surface contacting the nozzle formation surface, the third surface and the nozzle formation surface having a gap therebetween, and a liquid supply member having a supply flow path configured to supply the liquid to the nozzle formation surface, and wherein a liquid application width of the liquid application head is narrower than a width of the nozzle formation surface, and a liquid removal width of the liquid removal unit is wider than the liquid application width of the liquid application head in a direction perpendicular to the liquid application direction.

2. The cleaning apparatus according to claim 1, wherein the first surface of the liquid application head has a longer contact length with respect to the nozzle formation surface than the second surface.

3. The cleaning apparatus according to claim 1, wherein the liquid application member has a tip end portion formed into a taper shape in cross section to be expanded as being distant from the surfaces contacting the nozzle formation surface.

4. The cleaning apparatus according to claim 1, wherein the liquid application head further includes a liquid application member cover configured to cover the liquid application member, and the liquid application member is held between the liquid supply member and the liquid application member cover.

5. The cleaning apparatus according to claim 1, wherein the liquid application head and the liquid removal unit move with respect to the recording head while being in contact with the nozzle formation surface to perform cleaning.

6. The cleaning apparatus according to claim 5, wherein the liquid application head and the liquid removal unit concurrently move with respect to the recording head.

7. The cleaning apparatus according to claim 5, wherein the liquid application head and the liquid removal unit separately move with respect to the recording head.

8. The cleaning apparatus according to claim 1, wherein the liquid application head is arranged on the upstream side in the liquid application direction with respect to the liquid removal unit.

9. The cleaning apparatus according to claim 1, wherein the liquid removal unit is a wiping-off member configured to wipe off the nozzle formation surface.

10. The cleaning apparatus according to claim 9, wherein the wiping-off member is a blade extending in a direction perpendicular to the liquid application direction.

11. The cleaning apparatus according to claim 10, wherein the wiping-off member includes a plurality of blades.

12. The cleaning apparatus according to claim 11, wherein the nozzle formation surface of the recording head has an unevenness shape, and the plurality of blades are arranged in accordance with the unevenness shape.

13. The cleaning apparatus according to claim 1, further comprising an urging member configured to urge the liquid application member to the nozzle formation surface.

* * * * *